(12) United States Patent
Hinman et al.

(10) Patent No.: US 12,049,305 B1
(45) Date of Patent: Jul. 30, 2024

(54) ROTOR SYSTEM FOR ELECTRICALLY POWERED ROTORCRAFT

(71) Applicant: SiFly Aviation, Inc., Carmel Valley, CA (US)

(72) Inventors: Brian L. Hinman, Carmel Valley, CA (US); Muhammad Mubeen Javaid, Punjab (PK)

(73) Assignee: SiFly Aviation, Inc., Santa Clara, CA (US)

( * ) Notice: Subject to any disclaimer, the term of this patent is extended or adjusted under 35 U.S.C. 154(b) by 0 days.

(21) Appl. No.: 18/220,720

(22) Filed: Jul. 11, 2023

Related U.S. Application Data

(63) Continuation-in-part of application No. 18/306,108, filed on Apr. 24, 2023, which is a continuation-in-part
(Continued)

(51) Int. Cl.
  *B64D 27/24* (2024.01)
  *B64C 11/34* (2006.01)
  (Continued)

(52) U.S. Cl.
  CPC ............ *B64C 27/32* (2013.01); *B64C 11/343* (2013.01); *B64C 27/08* (2013.01); *B64C 27/57* (2013.01);
  (Continued)

(58) Field of Classification Search
  CPC ........ B64C 11/343; B64C 11/34; B64C 27/57
  See application file for complete search history.

(56) References Cited

U.S. PATENT DOCUMENTS 2,685,932 A * 8/1954 Hartel .................. B64C 11/343
  416/37
2,998,080 A * 8/1961 Moore, Jr. ............ B64C 11/343
  416/89
(Continued)

OTHER PUBLICATIONS

Wu, "Design and Development of Variable Pitch Quadcopter for Long Endurance Flight", Oklahoma State University, May 2018, 154 pages.
(Continued)

*Primary Examiner* — Timothy D Collins
*Assistant Examiner* — Justin Michael Heston
(74) *Attorney, Agent, or Firm* — Sunstein LLP

(57) ABSTRACT

A rotor system for electrically powered rotorcraft is described, providing the benefits of autorotation for safety, and fast thrust response, regardless of rotor inertia. The rotor system includes a rotor hub and two or more rotor blades, and an electric motor driving the rotor hub. The rotor hub includes a mechanism which adapts the collective incidence of the rotor blades in response to the torque applied by the electric motor. When there is little or no motor torque, the rotor hub holds the blades at a shallow incidence, which supports autorotative descent. During autorotative descent, the motor controller coupled to the electric motor utilizes electrical braking to moderate the rotor RPM and thrust. When the electric motor provides power to the rotor for normal flight, the collective blade incidence adjusts in response to the motor torque, providing a fast response in rotor thrust, thus avoiding the lag in rotor thrust that would occur through RPM control.

20 Claims, 17 Drawing Sheets

Related U.S. Application Data of application No. 17/105,558, filed on Nov. 26, 2020, now Pat. No. 11,578,611.

(60) Provisional application No. 63/359,944, filed on Jul. 11, 2022, provisional application No. 62/897,688, filed on Sep. 9, 2019.

(51) Int. Cl.
*B64C 27/08* (2023.01)
*B64C 27/32* (2006.01)
*B64C 27/57* (2006.01)
*B64C 27/59* (2006.01)
*B64C 27/72* (2006.01)

(52) U.S. Cl.
CPC .............. *B64C 27/59* (2013.01); *B64C 27/72* (2013.01); *B64D 27/24* (2013.01)

(56) References Cited

U.S. PATENT DOCUMENTS

| | | | |
|---|---|---|---|
| 7,677,492 | B1 | 3/2010 | Carter et al. |
| 9,914,535 | B2 | 3/2018 | Paulos |
| 11,174,016 | B2 | 11/2021 | Carter et al. |
| 11,634,235 | B1 | 4/2023 | Hinman et al. |
| 2014/0097290 | A1 | 4/2014 | Leng |
| 2017/0166302 | A1* | 6/2017 | Shiosaki ............... B64C 11/325 |
| 2017/0210480 | A1* | 7/2017 | Lauder .................... B64D 27/24 |
| 2017/0341733 | A1* | 11/2017 | D'Anna ................... B64C 27/82 |
| 2018/0029694 | A1* | 2/2018 | Vander Lind ........... B64C 29/02 |
| 2018/0086443 | A1* | 3/2018 | Bourne ................... B64C 27/12 |
| 2018/0257761 | A1 | 9/2018 | Oldroyd et al. |
| 2018/0297711 | A1 | 10/2018 | Oldroyd et al. |
| 2018/0346136 | A1* | 12/2018 | Arkus ..................... B64C 1/063 |
| 2019/0031361 | A1 | 1/2019 | McCullough et al. |
| 2019/0084684 | A1 | 3/2019 | Eller |
| 2019/0210717 | A1* | 7/2019 | Lauder ..................... H02K 7/14 |
| 2019/0263515 | A1* | 8/2019 | Karem .................... B64C 11/46 |

OTHER PUBLICATIONS

Harrison et al., "The Cierva Autodynamic Rotor", National Aeronautics and Space Administration, March 2015, 66 pages.

Uber Elevate, "Fast Forwarding to a Future of On-Demand Urban Air Transportation", Oct. 27, 2016, 98 pages.

European Union Aviation Safety Agency, "Means of Compliance with the Special Condition VTOL", Issue 2, May 12, 2021, 89 pages.

Paulos, "Rotorcraft Blade Pitch Control Through Torque Modulation", University of Pennsylvania Scholarly Commons, 2017, 149 pages.

* cited by examiner

ROTOR SYSTEM FOR ELECTRICALLY POWERED ROTORCRAFT

This application is a continuation in part of U.S. application Ser. No. 18/306,108 filed on Apr. 24, 2023, which claims the benefit of U.S. application Ser. No. 17/015,558 filed on Sep. 9, 2020, Issued on Apr. 25, 2023 as U.S. Pat. No. 11,634,235, which claims the benefit of U.S. Provisional Application No. 62/897,688, filed Sep. 9, 2019, and also claims the benefit of U.S. Provisional Application No. 63/359,944, filed Jul. 11, 2022. Each of these related applications is hereby incorporated herein by reference in its entirety.

TECHNICAL FIELD

The present invention relates to aircraft design, and more specifically to the design of a rotor system supporting autorotative descent and rapid thrust response, having minimal complexity and high reliability.

BACKGROUND ART

Rotorcraft became practical almost one hundred years ago. The first rotorcraft were autogyros, a predecessor to the modern helicopter. The autogyro is characterized by a free-spinning rotor that turns because of the passage of air through the rotor from below. The aerodynamic reaction of the rotor gives lift to the vehicle, sustaining it in the air. A separate propeller provides forward thrust, and can be placed in a puller configuration, with the engine and propeller at the front of the fuselage, or in a pusher configuration, with the engine and propeller at the rear of the fuselage. Juan de la Cierva of Spain is credited as the inventor of the autogyro, with his first successful prototype flying in January 1923. He was motivated to develop the autogyro following an airplane crash, resulting from a stall condition. The autogyro allows very slow forward flight, an inherent safety feature. By 1926, the term "autorotation" was first used, a description of the autogyro's main rotor turning without being directly powered. De la Cierva described autorotation as, "the process of producing lift with freely-rotating aerofoils by means of the aerodynamic forces resulting from an upward flow of air."

By the late 1930s, rotorcraft research and development had shifted from enhancements of autogyro designs, to the perfection of the helicopter. The key enabling technology for the helicopter was the swashplate, an innovation first proposed by Boris Yur'iev in Russia in 1911. In layman's terms, the swashplate resembles a "Lazy Susan," with the pitch of the rotor blades articulated by linkages that ride along the rotating portion of the swashplate. The swashplate allows for both cyclic (tilt) and collective (thrust) control of the rotor, typically with three push rods that articulate the lower stationary portion of the swashplate. When all three push rods are raised and lowered in unison, a change of collective occurs. When the rods move differentially, the swashplate tilts, causing the rotor blades to vary pitch as a function of angular position, which is cyclic.

Igor Sikorsky is credited with the development of the modern helicopter, consisting of a single main rotor having a swashplate, and a tail rotor to counter-act the torque resulting from the drag force of the main rotor acting upon the fuselage. Because the helicopter can take off and land from a stationary position, and hover indefinitely under full control, it was obvious that the helicopter was superior to the autogyro. Since the early years of helicopter research, autorotation was deemed a necessary feature, as the autogyro had demonstrated the safety benefits. In 1936, three years before Sikorsky flew his VS-300, Heinrich Focke and Gert Achgelis were the first to demonstrate helicopter autorotation, with the introduction of their Fa-61 tandem rotor helicopter. All helicopters developed following this early work have been capable of autorotative descent.

Since the earliest days of helicopter development, it has been known that the large inertia of the rotor system would not allow the engine RPM to be a means of adjusting the thrust. Collective is the sole means of adjusting the thrust, while the engine is typically governed to maintain a constant RPM throughout all phases of flight. The large rotor inertia becomes a desirable characteristic of the helicopter during an emergency loss of power, as it provides sufficient time for the pilot to respond to the situation, lowering the collective control, and thus entering autorotative descent before there is a catastrophic loss of rotor speed.

For a helicopter to emulate the graceful decent of the autogyro, several conditions must be met:

1) The swept rotor area needs to be sufficiently large, ensuring a safe rate of descent to the ground. In layman's terms, the rotor acts much like a parachute, and must have a sufficient area for a given weight.
2) The helicopter should have forward airspeed at the time when driving power is lost, allowing enough air to flow in a reverse direction through the rotor disk to ensure a safe rate of descent. Otherwise, the helicopter needs sufficient altitude for the pilot to push the cyclic forward when power is lost, a maneuver required to gain airspeed to sustain autorotation.
3) When power is lost, the rotor blades must quickly be brought to an incidence angle near zero degrees. Within a matter of seconds, a helicopter previously operating under power, with a blade incidence in the range of 5 to 15 degrees, will lose enough rotor speed to become irrecoverable, dropping uncontrollably to the earth. By reducing the rotor blade pitch, the drag forces of the rotor are reduced to an extent that they balance with the driving forces of reverse airflow brought about through autorotation.

While the detailed physics of autorotation is quite complex, a simple explanation follows from a consideration of how the portions of the rotor disk act during autorotative descent. In FIG. 1, we consider the three annular regions of the rotor disk. In each region, the speed of movement in rotation, relative to the air flowing through the disk, creates a different dynamic. In the innermost portion of the disk, Region A, near the rotor hub, the blade is moving slowly along the circular path, and the resulting airflow over the blade exceeds the stall angle for the airfoil. Region A is described as the "stalled region," and the drag force has the effect of reducing the rate of blade rotation. In the middle region of the disk, Region B, described as the "driving region," the aerodynamic force vector is inclined slightly forward with respect to the axis of rotation. This has the effect of providing lift while also increasing the rate of blade rotation. The outermost annular region of the disk, Region C, is described as the "driven region." With the increased rotational velocity, the aerodynamic force vector now acts behind the axis of rotation. The vertical component contributes to lift, at the expense of the horizontal drag component, which slows the blade rotation. Allowing nature to take its course, the rotor may achieve an equilibrium rate of rotation and descent such that the driven and drag forces are equal. Having a blade pitch near zero degrees generally ensures a large enough driving region to sustain autorotation.

The rate of descent in autorotation varies depending upon a number of factors, including forward airspeed and blade pitch. An important consideration is the design factor called "disk loading." Disk loading refers to the weight of the rotorcraft relative to the swept area of the rotor(s). Talbot and Schroers at NASA Ames Research Center wrote a paper in 1978 describing a simple calculation for the minimum rate of autorotative descent for single-rotor helicopters. As they described, the rate of descent grows in proportion to a ratio of the minimum power coefficient in forward flight, divided by the coefficient of thrust. For typical helicopters, the minimum power to sustain level forward flight is about 60% of the power necessary to hover out of ground effect. Rotor efficiency, called the "merit factor," has an inverse first order relationship with descent rate. For a modern helicopter, a merit factor of 75% is typical. With these rules of thumb, one can substitute and manipulate the Talbot and Schroers descent equation to find:

$$V_{min\_descent} = 0.336 \ m/s * \sqrt{D.L.N/m^2} + 2.30 \ m/s \quad (1.)$$

Disk loading, as indicated, is entered in SI units. For historical reasons, rotorcraft engineers continue to discuss disk loading in English units of pounds and feet. The form of the equation then becomes:

$$V_{min\_descent} = 2.330 \ m/s * \sqrt{D.L.lbs./ft^2} + 2.30 \ m/s \quad (2.)$$

While a subjective assessment of individual helicopter pilots, an autorotative descent rate greater than 9 m/s is considered unsafe, as it does not allow sufficient margin for pilot error in the final stages of the autorotation process. Substituting into equation (2.), we find a maximum disk loading of 8.3 lbs/ft$^2$ for a helicopter capable of safe autorotation. Correlating this estimate with industry practice, modern turbine-powered helicopters have a disk loading in the range of 3 lbs/ft$^2$ to 8 lbs/ft$^2$.

Throughout the twentieth century, rotorcrafts were powered by internal combustion engines. Early helicopters used Otto-cycle piston engines. The original Sikorsky helicopter, for example, was powered by a 75 hp piston engine. By 1948, the turboshaft engine was introduced, offering much higher power density than piston engines. Subsequently, most large helicopters, capable of carrying four or more people, employ turboshaft engines. Up to the present day, small helicopters continue to be powered by piston engines, reflecting the lower acquisition and maintenance cost of piston engines relative to turboshaft engines.

Electrically-powered ground vehicles have finally begun to displace fossil-fuel-powered ground vehicles. While the first electric automobile was demonstrated in 1881, four years before Karl Benz built the first practical automobile powered by an internal-combustion engine, the limited energy capacity of early batteries, combined with the inconvenience of charging, rendered electric automobiles impractical for widespread use. Although several automotive companies have attempted to revive the electric car over the century that followed, it was Tesla Motors, combining thousands of high-capacity consumer electronics Lithium-Ion batteries that brought the electric automobile into widespread use. With a range of more than 200 miles, and a recharge time of less than one hour, Tesla demonstrated the key requirements for market viability. Current circumstances, including rising oil prices, unfavorable climate change, political instability, and government incentives, will continue to accelerate the adoption of electric vehicles. Certainly by 2050, most ground vehicles sold worldwide will be electrically powered.

The adoption of electric power for airborne vehicles has been much slower than for ground vehicles. In October 1973, the world's first electrically powered airplane, the Austrian Militky MB-E1, was flown. Powered by Ni—Cd batteries available at that time, the aircraft could fly for just 12 minutes. Many years passed with minimal advancement of crewed electric aircraft. Electrically powered uncrewed quad-copter drones emerged in 1999, as a platform for a broad range of military, commercial, and consumer applications. In 2013, DJI introduced their first quad-copter drone, which subsequently became a mass-market success. While flight times of quad-copter drones are typically 20 minutes or less, there are numerous use cases, typically including video and still image capture.

Quad-copter drones differ from crewed helicopters in their basic means of control. Because the rotors have modest inertial energy relative to the driving power, the thrust response to changes in electric motor power is rapid, allowing RPM control of low-cost brushless DC (BLDC) motors. With the elimination of complex mechanisms for blade pitch adjustment, quad-copter drones have become extremely low-cost aircraft, often sold for less than $100 as a consumer device.

Renewed interest in crewed electric aircraft was sparked by the Uber Elevate white paper released in October 2016 entitled, "Fast-Forwarding to a Future of On-Demand Urban Air Transportation." The white paper makes the case for short-range, electrically powered, vertical-take-off-and-landing aircraft, capable of carrying passengers to and from urban centers to outlying areas, to reduce travel time and avoid congested freeways. Because the range and flight time for "urban air mobility" are short, the white paper argues that soon-to-be-available battery technology can meet the requirements. In the seven years since the Uber Elevate white paper, worldwide development of crewed electrically powered vertical take-off-and-landing aircraft (eVTOLs) has flourished, with more than 700 projects currently under development. Most of these eVTOL projects aspire to address the vision of "urban air mobility" first promoted by Uber.

Except for a small number of eVTOL projects resembling electric helicopters, autorotation is not a safety feature promoted by the eVTOL developers. Many of the eVTOLs are designed with very high disk loading, as they have optimized for forward speed at the expense of hovering efficiency. Such eVTOLs would be incapable of autorotation, per the physics described above. A few multi-rotor eVTOL designs have a disk loading of less than 8 lbs/ft^2, which would allow auto-rotation if other design features were included. One of the recently introduced designs is said to support autorotation, while the other developers are either silent on the topic, or the developers specifically say that they will not support autorotation. In January 2019, Bell Helicopters, renown for traditional helicopters, announced an eVTOL with six ducted fans, called the Nexus. Shortly after the introduction, executives from Bell were asked whether the Nexus would support autorotation, to which the reply was, "We do not envision the Nexus landing under anything other than powered flight." A Bell executive elaborated by saying, "Power failure is prevented by a combination of redundancy and reliable systems. But [power failure] won't happen, because we're designing in appropriate redundancy and reliability."

Unlike quad-copter drones, many of the crewed eVTOL designs have rotor systems supporting both RPM control and collective control. Very few include cyclic control however, as a plurality of rotors typical of eVTOLs obviates the need. With rotor inertial energy becoming large relative to the driving power, the addition of collective control improves the thrust response time. Moreover, for tilt-rotor electric aircraft, adjusting collective pitch provides a means to optimize the propulsive efficiency as a function of airspeed. During hovering and low-speed forward flight, blade pitch is kept shallow, while at high-speed forward flight, blade pitch becomes steep.

To date, not a single eVTOL developer, of the more than 700 projects under development, has achieved certification under FAA or EASA rules. Under the EASA regulations published in May 2021, entitled "Means of Compliance with the Special Condition VTOL," the document instructs the reader, when referencing prior rotorcraft regulations, to substitute the word "Autorotation," with "Controlled Emergency Landing." As the general trend in updates to aviation regulations, the goal with the new language is to move from a prescriptive design requirement, of specifically requiring autorotation capability, to a performance-based airworthiness standard, requiring a means of controlled emergency landing. Certainly, it is possible to achieve the performance-based standard without autorotation, though it requires much more stored energy to achieve a controlled emergency landing, as Bell has proposed, through powered flight. If an emergency occurs at a high altitude, for example through a battery failure, the remaining stored energy requirement will become large to the extent that the eVTOL does not glide as an airplane, or autorotation as a helicopter.

The arguments cited by eVTOL developers opposed to the future use of autorotation are three-fold:
(1.) Large rotors require more landing area, limiting aircraft use in urban settings,
(2.) Aircraft in "edgewise flight" have too much drag to operate at high speeds,
(3.) Certification can be achieved without autorotation, so adding it will just slow the process.

The inventor respectfully disagrees with these arguments. Because noise scales as the sixth power of rotor tip speed, and rotor tip speed scales in inverse proportion to the rotor diameter, it is critically important for a rotorcraft intended for urban and suburban operation to have large diameter rotors, else the noise will limit the acceptance by those living and working in proximity to vertiports. Regarding aerodynamic drag, while it is generally true that large rotors have substantial drag in forward flight, much of that can be eliminated by compounding the aircraft with a propeller for horizontal propulsion, allowing the rotor(s) to remain in a plane that is generally parallel with the direction of forward flight. Sikorsky has successfully demonstrated this concept with a series of compound coaxial helicopters, including the SB-1 Defiant Raider jointly developed with Boeing, capable of cruising at 250 knots. Lastly, regarding the effort to achieve certification, one can argue that the ability to autorotate would simplify the certification cycle, as it does not require powered flight and hence battery power, rather using regenerative braking to control the rotors throughout descent.

While autorotation is a safety feature associated with crewed rotorcraft, it can also be applied to uncrewed rotorcraft. Such rotorcraft, commonly referred to as "drones," have widespread use in government, commercial and consumer applications. As drones begin to be flown over populated areas, under autonomous control, the risk to human life and property on the ground will receive increasing consideration. Drones, unlike type-certified aircraft that carry humans, are designed and manufactured with little regulatory oversight. Consequently, drones will have much lower reliability than certified aircraft. Combining the factors of many more drones in the air than type-certified aircraft and inherently lower drone reliability, autorotation may become a mandatory safety feature for multi-rotor drones in the future.

Juan de la Cierva and his contemporaries developed the foundational rotorcraft rotor hub technologies during the 1920s and 1930s. While initially targeting the perfection of the autogyro, many of the concepts carried through to helicopters and even to some electrically-powered eVTOLs under development today. Most notably, de la Cierva developed the articulated rotor, with flapping and lead-lag hinges. What de la Cierva called "Delta-3" hinge coupling, whereby the upward flapping of the blade results in a reduction of blade incidence angle, has become a standard feature in most helicopters, as it effectively compensates for the dissymmetry of lift during forward flight. Delta-3 coupling also reduces hub stress which could otherwise lead to mechanical failure. De la Cierva was firmly of the belief that the pilot should not require controls to manually adjust the blade incidence angle, rather having mechanisms in the rotor hub to automatically adjust the blade incidence angle with changing flight conditions. This philosophy gave rise to various combinations of hinge coupling mechanisms between feathering, lead-lag and flapping axes. De la Cierva also patented designs that varied the blade incidence angle as a function of rotor torque.

While the autogyro had a short-lived history for commercial and military use, it has continued to survive in General Aviation, often in the form of ultralight aircraft. Notably, Igor Bensen, a Russian immigrant to the United States, introduced the lightweight "gyrocopter" in 1955. He subsequently began production of the Bensen B-8M, which became quite popular with sport pilot enthusiasts. Similar designs to the Bensen gyrocopter remain in production to the current time.

In 1994, Jay Carter, a mechanical engineer with aircraft and wind generator design experience, took an interest in advancing the state-of-the-art in gyrocopter design. His foundational concept was to reduce the rotor speed and blade incidence with forward flight, transitioning the lift from the rotor to fixed wings mounted to the fuselage. He called his new architecture a "Slowed Rotor Compound" (SRC) aircraft, and he applied for several patents to protect his inventions. One of Carter's core patents was U.S. Pat. No. 7,677,492 B1, "Automatic Mechanical Control of Rotor Blade Collective Pitch," described in FIGS. 2 and 3. Through a governor mechanism relying upon centripetal force, the rotor blade incidence is increased in a linear relationship with the rotor speed. At take-off, operating with engine power applied to the rotor, Carter provides an example of a 600 rpm rotor speed giving rise to a 12-degree blade incidence. Once the aircraft reaches its cruising speed, Carter describes the rotor speed dropping to just 180 rpm, and the blade incidence being reduced to just 3 degrees. As Jay Carter discussed in an interview in 2014, a critical innovation was to adjust the rotor mast angle throughout flight, else the rotor would not naturally reduce in speed while in high-speed autorotative flight. With the goal of operating the aircraft at a forward velocity exceeding the rotor tip speed (Mu>1.0), the rotor must be designed to deal with a full stall condition on the retreating side of the rotor disk. One of Carter's solutions was adding rotor tip weights, which increases the rotor inertia, while maintaining the blades in a rigid state throughout flight.

Jay Carter publicly discussed the application of his SRC concept to electrically-powered aircraft through a partnership with Mooney, revealing his initial eVTOL concept at the Uber Elevate Summit in April 2017. While the Mooney relationship proved short-lived, Carter presented a refined design, with two propellers on either side of a fixed wing, at the Vertical Flight Society Forum in May 2018. He subsequently reached an agreement to license the SRC technology, including the application to eVTOLs, to a newly formed company, Jaunt Air Mobility LLC. Carter and Jaunt engineers have continued to seek US patent protection for their ongoing innovations of eVTOL SRC technology. FIG. 4 is an illustration from U.S. Pat. No. 11,174,016, with four exemplary propellers having distinct incidence angles relative to the longitudinal axis of the aircraft fuselage. As described in the patent, the varying incidence angles allows the flight control computer to apply slight pitch, roll or yaw moments to maintain a desired attitude in flight. As with original Carter SRC aircraft, the Jaunt eVTOL designs maintain the capability for autorotative flight, a key safety feature within an industry which has otherwise largely abandoned autorotation.

In 2017, James Paulos of the University of Pennsylvania published his PhD Dissertation entitled, "Rotorcraft Blade Pitch Control Through Torque Modulation." In 2018, Paulos received U.S. Pat. No. 9,914,535 protecting this novel technology. Paulos identified the opportunity to adjust BLDC motor torque through 360 degrees of rotation, and in conjunction with a novel rotor head, he demonstrated cyclic control without a swashplate. With an increase in torque, one of two rotor blades increases in blade incidence, while the other blade decreases in blade incidence. With a decrease in motor torque, the opposite occurs. Repeating this process each revolution of the BLDC motor, swashplate emulation is achieved. Of note, the Paulos rotor only provides cyclic control, and thus having an average blade pitch for powered flight, the aircraft he developed would not be capable of autorotative descent.

SUMMARY OF THE EMBODIMENTS

The present rotor system for electrically powered rotorcraft includes a rotor hub mechanism that adapts the rotor blade incidence angle in response to the torque applied from the drive motor, and a means of electrically braking the motor, typically in the absence of drive power, such that the rotor continues to spin at a controlled rate during autorotative descent. Thus, some embodiments of the rotor system do not require explicit collective blade pitch control, either from the pilot or flight computer, such as disclosed in U.S. Pat. No. 11,634,235.

In an illustrative embodiment of the rotor system, the blade incidence angle has two states, one for powered operation, and one for autorotative operation. During powered operation, when the driving torque exceeds a threshold magnitude, the blade collective incidence angle becomes 11.0 degrees. During a loss of power, when the driving torque to the rotor approaches zero, the blade collective incidence angle becomes 1.0 degrees. The low angle of incidence ensures that the rotor will continue to turn in a windmill state, with reverse flow through the rotor disk, whereby the driving region of the rotor is sufficiently dominant over the driven and stall regions, to cause acceleration of the rotor speed beyond its normal rate. As a governing methodology, to maintain the rotor speed within a safe range and to control thrust relative to other rotors, electrical braking of the motor is applied. The energy derived from braking can be dissipated through resistance, or it can be regenerated into a battery or super-capacitor. Regeneration is advantageous, so as to allow power recovery during the final stages of autorotative descent.

In other embodiments of the rotor system for electrically powered rotorcraft, the blade incidence does not modally transition with applied motor torque. Rather, the blade incidence increases in proportion with applied motor torque, either through a linear or non-linear relationship. Through the inclusion of a loading spring, some embodiments hold the blade incidence at approximately 0.0 degrees until a threshold torque is applied, at which point the blade incidence linearly increases with torque until 13.0 degrees is reached. In this position, a hard stop prevents further increases.

While the proportionate relationship between torque and blade incidence has no particular benefit nor detriment in the autorotative state, since blade incidence is held near 0.0 degrees throughout autorotation, it can provide benefit during normally-powered flight. For example, as rotors become large, the inertia contributed by the rotor blades makes RPM control impractical due to the resulting sluggishness of the thrust response when modulating motor power. However, if a change in motor torque results in an almost immediate change in blade incidence, then rotorcraft with large rotor inertia, employing certain embodiments of the rotor, can exhibit the rapid response characteristic of rotorcraft with explicit collective control.

Refined embodiments of the rotor system provide a non-linear response of blade incidence as a function of applied torque. Because torque and thrust do not have a linear relationship, attempting to force such a relationship with a linear spring results in an initial thrust response that is linear, followed by a slowing of the rotors to compensate for applying too much blade incidence for a given rotor torque. We mathematically show that a non-linear spring, designed to have an angular displacement following the torque raised to the (2/3)-power, allows the rotor to maintain relatively constant RPM throughout variations in drive motor torque and the resulting change in blade incidence and rotor thrust.

Many embodiments of the rotor system are driven by brushless DC (BLDC) motors. As with any BLDC motor, it is powered from a motor controller, often called an electronic speed control (ESC). The ESC takes a DC power source, such as a battery, and creates commutation power signals to drive three sets of motor windings within the BLDC motor. Certain models of existing commercial ESCs provide a programmable braking functionality, which can be advantageously used to implement autorotative descent with the rotor system. Though certain embodiments of the rotor system, such as those having a non-linear spring resulting in constant rotor RPM, cannot be controlled by the commercially available ESCs, which adjust the motor speed in accordance with an input signal. Rather, a form of motor controller is described, which takes a throttle input, and modulates the motor torque rather than the motor RPM. We refer to this as an electronic torque control (ETC). Moreover, some embodiments of the motor controller include both the braking functionality and the torque-control functionality, to realize the rotor benefits of both autorotative descent and rapid thrust response.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "Delta-3" coupling of a rotor blade to a hub is a coupling that adjusts blade incidence in relation to blade flapping angle in a manner tending to reduce dissymmetry of lift during forward flight.

A "set" includes at least one member.

Figure 1:
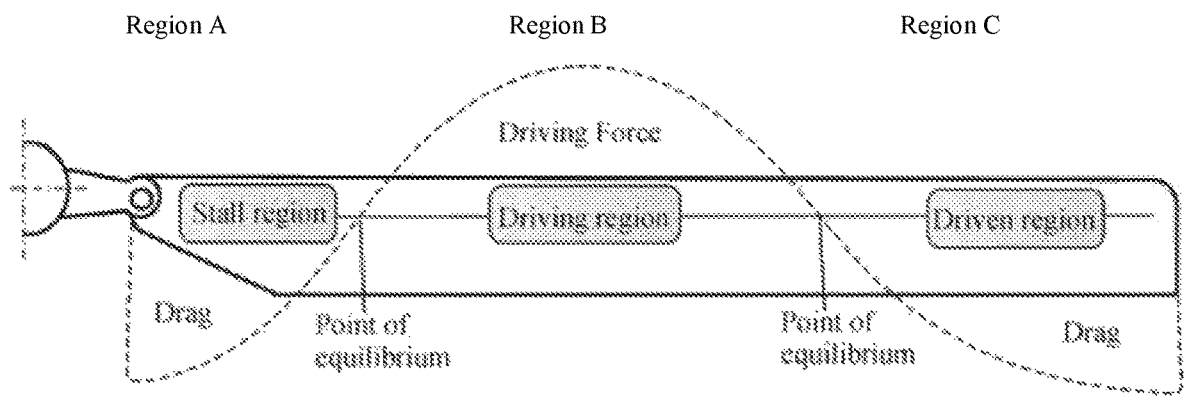
FIG. 1 shows three regions of a rotor in autorotative descent:
- (a.) Stall region—Rotor blade operates above its stall angle, resulting in drag, and reducing the rate of rotation.
- (b.) Driving region—The aerodynamic force vector is inclined slightly forward with respect to the axis of rotation, providing thrust that leads to the acceleration of the blade rotation.
- (c.) Driven region—The aerodynamic force acts behind the axis of rotation, creating lift that is offset with a drag force that decelerates the blade rotation.
Figure 2:
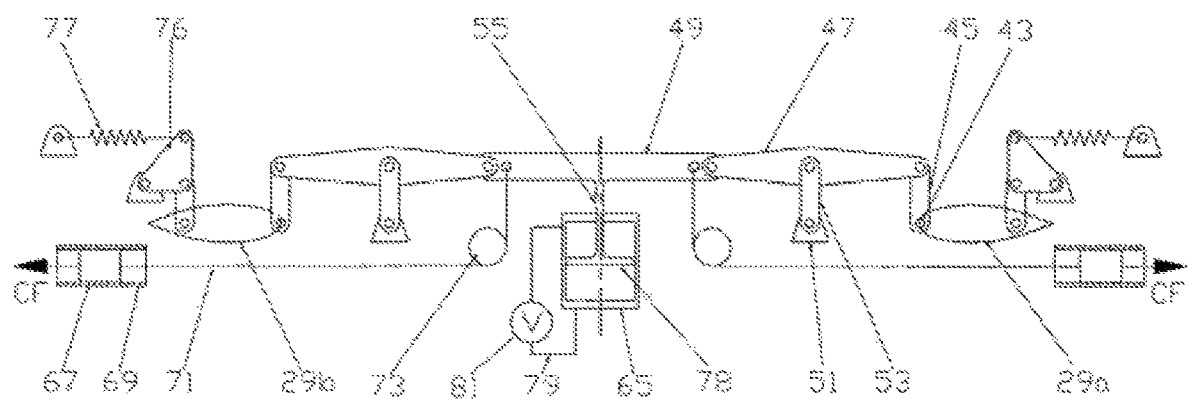
FIG. 2 is a schematic view of an automatic pitch controller.
Figure 3:
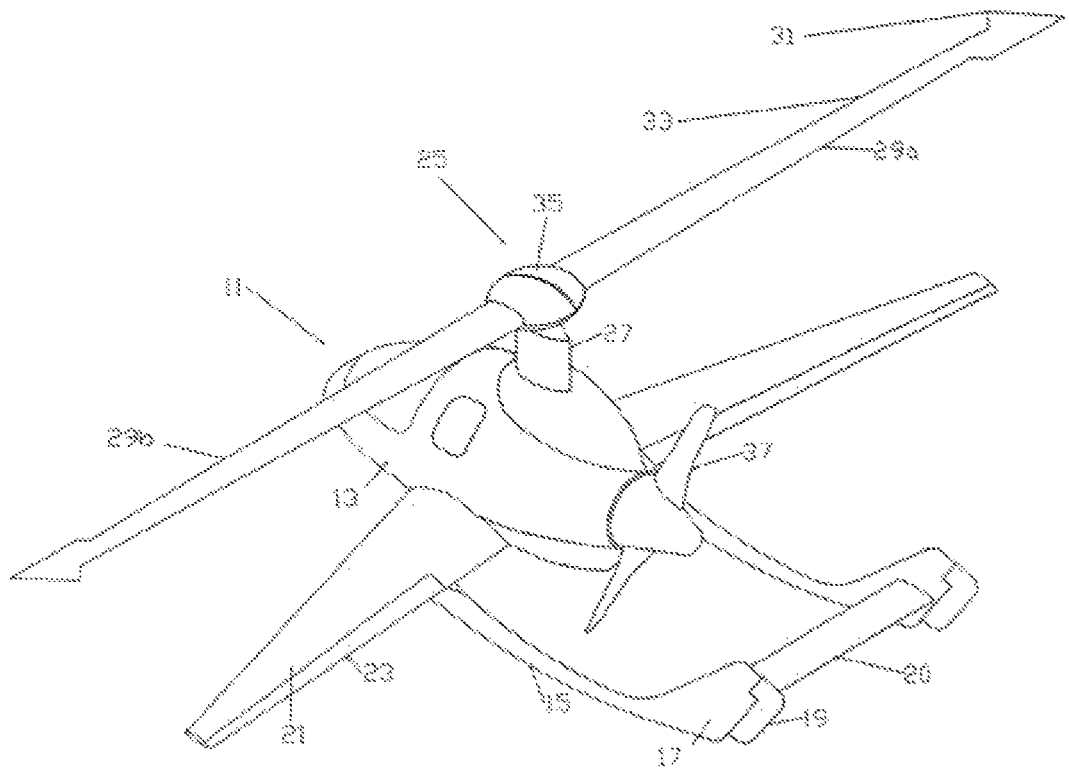
FIG. 3 is a perspective view of rotor aircraft including an automatic pitch controller.
Figure 4:
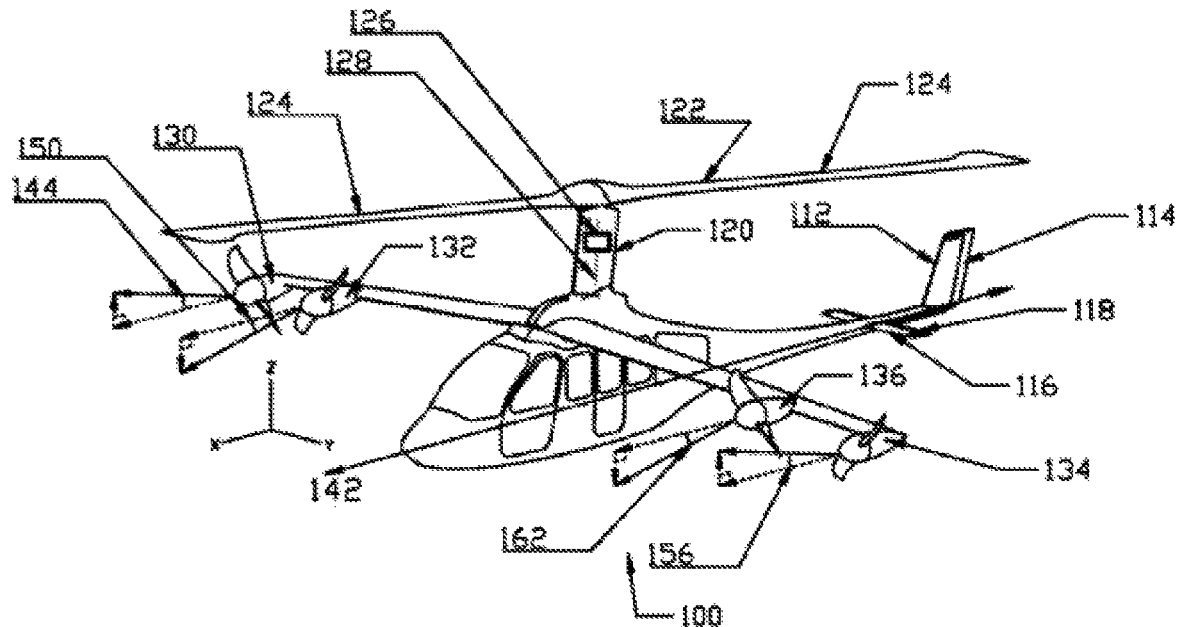
FIG. 4 is an illustration from U.S. Pat. No. 11,174,016, "Compound Rotorcraft with Propeller," commercially described as the Jaunt Mobility ROSA (Reduced-rotor Operating Speed Aircraft).
Figure 5:
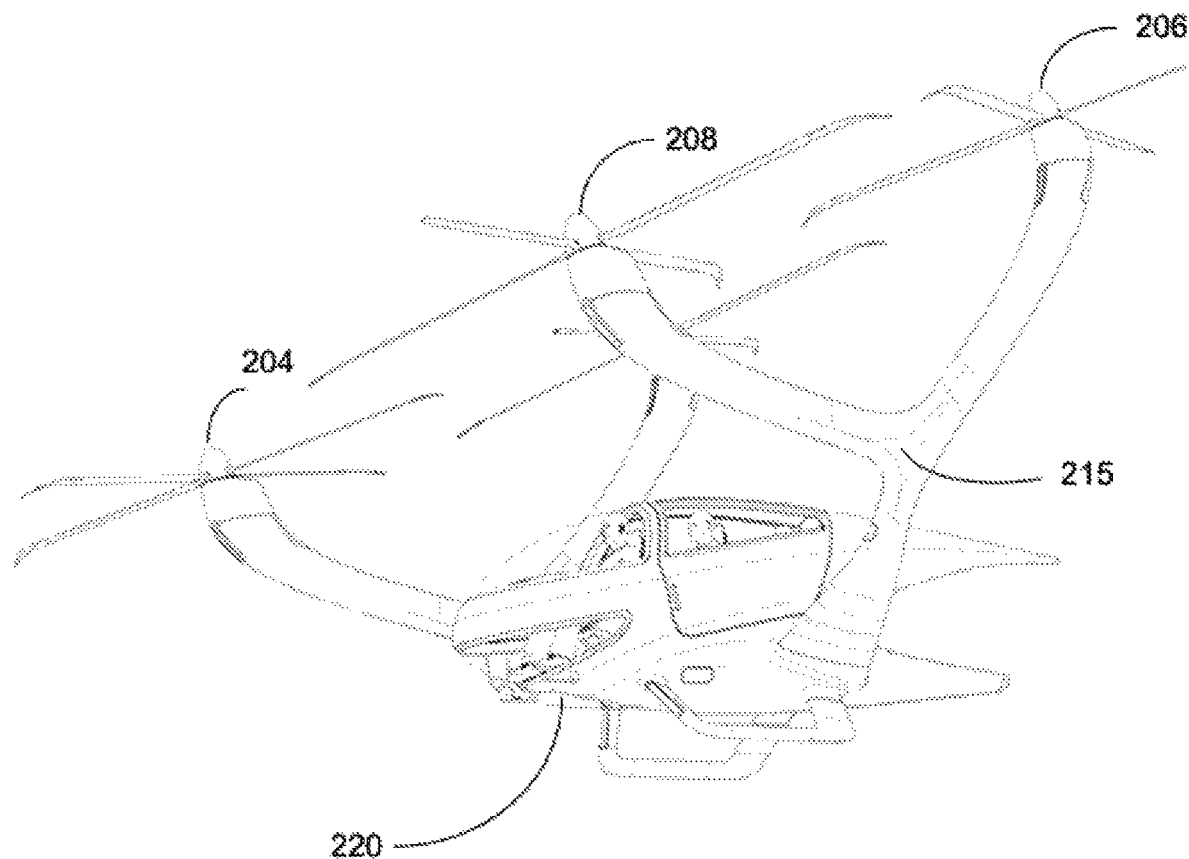
FIG. 5 is an illustration from U.S. Pat. No. 11,634,235, "Electrically Powered Rotorcraft Capable of Autorotative Landing," issued to the inventor of the presently disclosed invention.

U.S. Pat. No. 11,634,235, "Electrically Powered Rotorcraft Capable of Autorotative Landing" describes methods of achieving controlled autorotative descent for an electrically-powered rotorcraft having four or more rotors. These methods include the use of active collective adjustment for pitch and roll control, and the use of electrical braking for yaw control. FIG. 5 illustrates an embodiment of such a rotorcraft, a four-rotor eVTOL capable of controlled autorotative landing. In the more recent U.S. patent application Ser. No. 18/306,108, "Rotorcraft Autorotation Control Through Electrical Braking," methods of achieving controlled autorotative descent by first reducing collective on all rotors, and then using electrical braking alone to achieve roll, pitch and yaw control are disclosed. The "Rotor System for Electrically Powered Rotorcraft" described herein is an enabling technology for autorotation control utilizing electrical braking.

Figure 6:
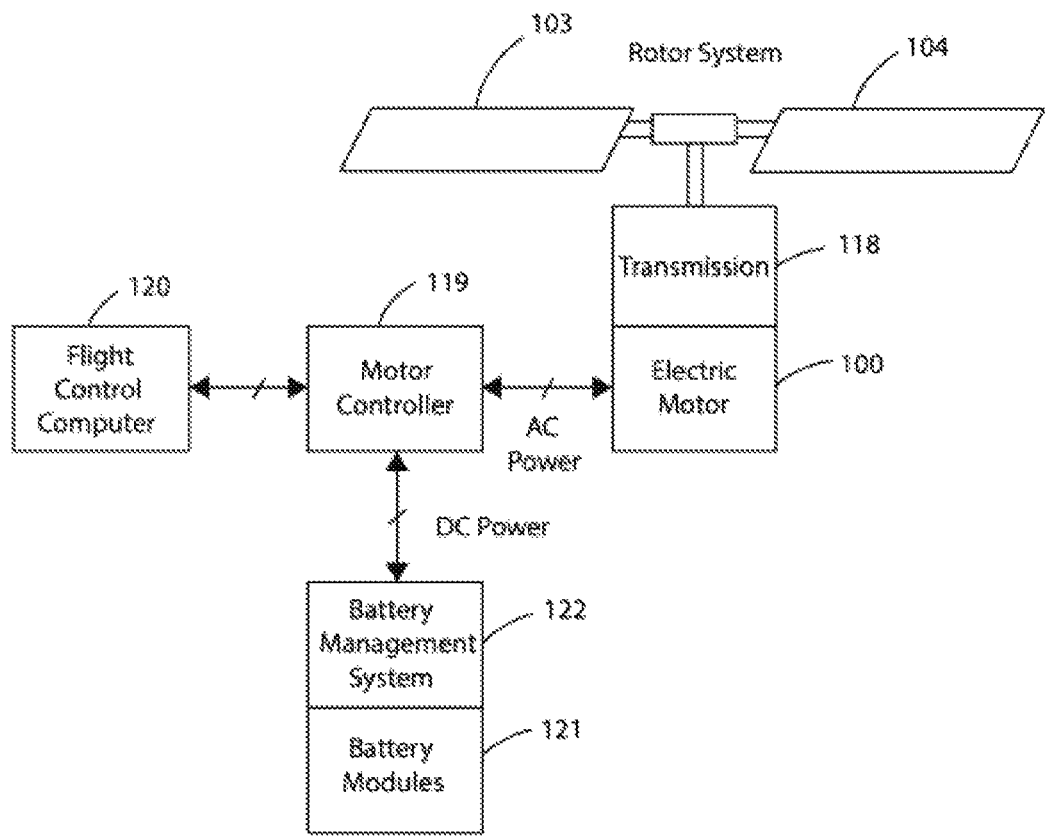
FIG. 6 is a block diagram of a rotor system in accordance with one embodiment of the invention.

FIG. 6 is a block diagram of a rotor system in accordance with one embodiment of the invention. The rotor is driven by an electric motor 100 reduced in speed through an optional transmission 118. While some embodiments do not include the transmission, it serves an important function, of allowing the electric motor 100 to operate at a high speed, albeit at a modest torque. For example, typical BLDC motors operate with their best efficiency when the torque is in the range of 10% to 15% of the stalled-motor (maximum) torque. While some electric aircraft developers have attempted to overcome this issue by increasing the diameter of the motors and the permanent magnet mass, it has been shown to be more weight effective to include a transmission, allowing a lower mass motor to spin at a higher speed.

BLDC motors are commonly employed for electric rotorcraft. While the name implies constant DC power being applied, they are in fact run with an alternating voltage, typically with three phases. Much like the original 3-phase permanent magnet motors created by Nikola Tesla in the 1880s, BLDC motors turn in a synchronous fashion with the 3-phase power applied, whereby the voltage and commutation frequency scale in proportion to the speed of the motor. Electrical current has an affine relationship with the resulting time-averaged torque, offset by the minimum current necessary to begin turning the motor. The device that powers a BLDC motor is called a motor controller 119, also referred to as an electronic speed control (ESC). Low-cost ESCs use square-wave signals for the three phases and higher performing ESCs provide signals of varying amplitude, such as sinusoidal signals. Those with varying amplitude signaling typically include "field-oriented control" (FOC), and thus the signals are generated through a control loop to avoid some variation in torque during rotation. FOC ESCs offer the highest efficiency and the lowest acoustic and electromagnetic noise. They have thus become common when designing electrically-powered aircraft.

In FIG. 6, motor controller 119 is controlled by the flight control computer 120. Signaling between the flight control computer 120 and the ESC 119 can be any number of schemes, most typically involving digital signaling. Model aircraft typically control the ESC speed through a form of pulse width or pulse position modulation. Larger uncrewed or crewed aerial vehicles have adopted serial communication interfaces such as CAN-bus, which has been widely used in the automotive industry. In many embodiments, the desired motor speed and torque are computed through a control state machine running on the flight control computer 120. Inputs to the state machine may include inertial, magnetometer, barometric, air speed, radar, lidar, and GPS/GNSS sensor data, and other inputs as appreciated by one having skill in the art, along with flight path instructions. In some embodiments the flight path instructions come from a human pilot, either through flight controls onboard the aircraft or remotely conveyed pilot controls. Alternatively, the flight path instructions may have been stored onboard the aircraft prior to flight, allowing fully autonomous operation.

Power for fully-electric aircraft is usually derived from batteries. In the present era, lithium-ion batteries offer the highest practical energy density, and they have become common for electric vehicles. Similar batteries are used for fully-electric aircraft. Alternative sources of energy for electrically propelled aircraft include fuel cells, most often converting hydrogen and oxygen into water, and hybrid power generators, whereby an internal combustion engine drives an electrical generator, which then powers the aircraft. Hybrid power aircraft often include batteries, which allows a short-term disparity between the rate at which power is generated, and the rate at which power is consumed. The other advantage of the batteries is to serve as an emergency energy source should the hybrid power generator fail.

Batteries are arranged in an array to form battery modules 121, including series connections to increase the voltage, and parallel connections to increase the current capability. While the battery modules 121 may have a direct connection to the motor controller 119 and other onboard electronics, it is most common to include battery management system 122 between the battery module 121 and both onboard and offboard connections. The battery management system 122 has several functions, both to maintain the health of the individual battery cells, as well as to prevent potentially catastrophic failure conditions, including deadly fires. During charging, for example, the battery management system 122 maintains a balancing of the voltages across all cells within battery modules 121 array, which is essential to fully charge the battery module 121 without overcharging any individual cells. Battery management system 122 will prevent the battery modules 121 from being overcharged, as well as preventing battery module 121 from being over-discharged. For example, many battery management systems disconnect the battery array from continued discharging once cell voltages drop to a threshold of 2.5V. Preferred embodiments of battery management system 122 also monitor temperature, only allowing charging or discharging when temperatures are maintained within a safe range. Some embodiments of battery management system 122 comprise one or more super capacitors. The super capacitors may provide short-term energy during an emergency event, for example, if battery modules 121 fail or become fully discharged.

Figure 7:
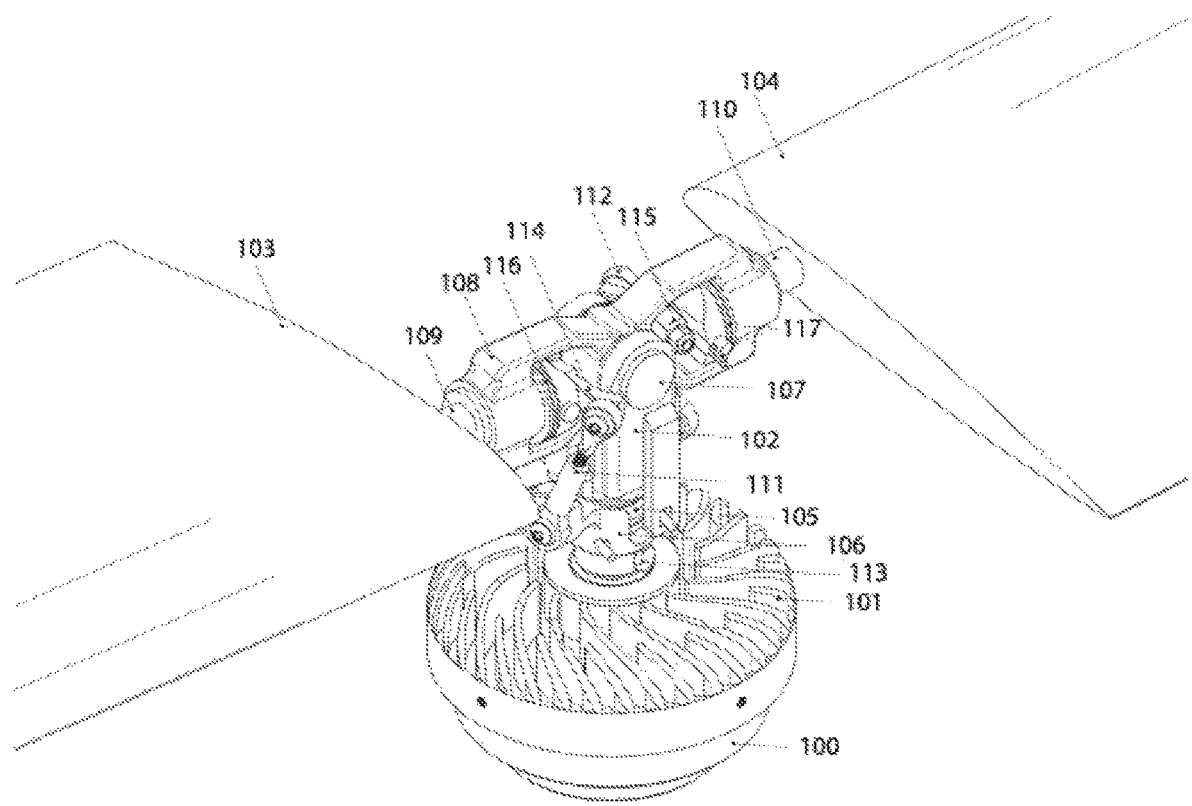
FIG. 7 is an isometric view of rotor hub 102 and drive motor 100 for an electrically-power rotorcraft in accordance with one embodiment of the invention.

FIG. 7 is an isometric view of rotor hub 102 and drive motor 100 for an electrically-power rotorcraft in accordance with one embodiment of the invention. To improve motor cooling, ensuring long-term reliability, heat sink 101 is mounted to the top of drive motor 100. Rotor hub 102 operates with two rotor blades 103, 104 mounted on teetering hinge 107 and offset by 180 degrees. Such a two-bladed configuration has become common for helicopter design, first adopted by Juan de la Cierva in his gyrocopter designs of the 1920s. Rotor hub 102 includes a Delta-3 coupling. As described earlier, Delta-3 coupling reduces the blade incidence with upward flapping, while increasing blade incidence with downward flapping. Delta-3 coupling reduces the dissymmetry of lift during forward flight and reduces mechanical stress that could otherwise result in mechanical failure. Rotor hub 102 also comprises torque-activated mechanism 105, 106, mounted at the base of the rotor hub.

Figure 8:
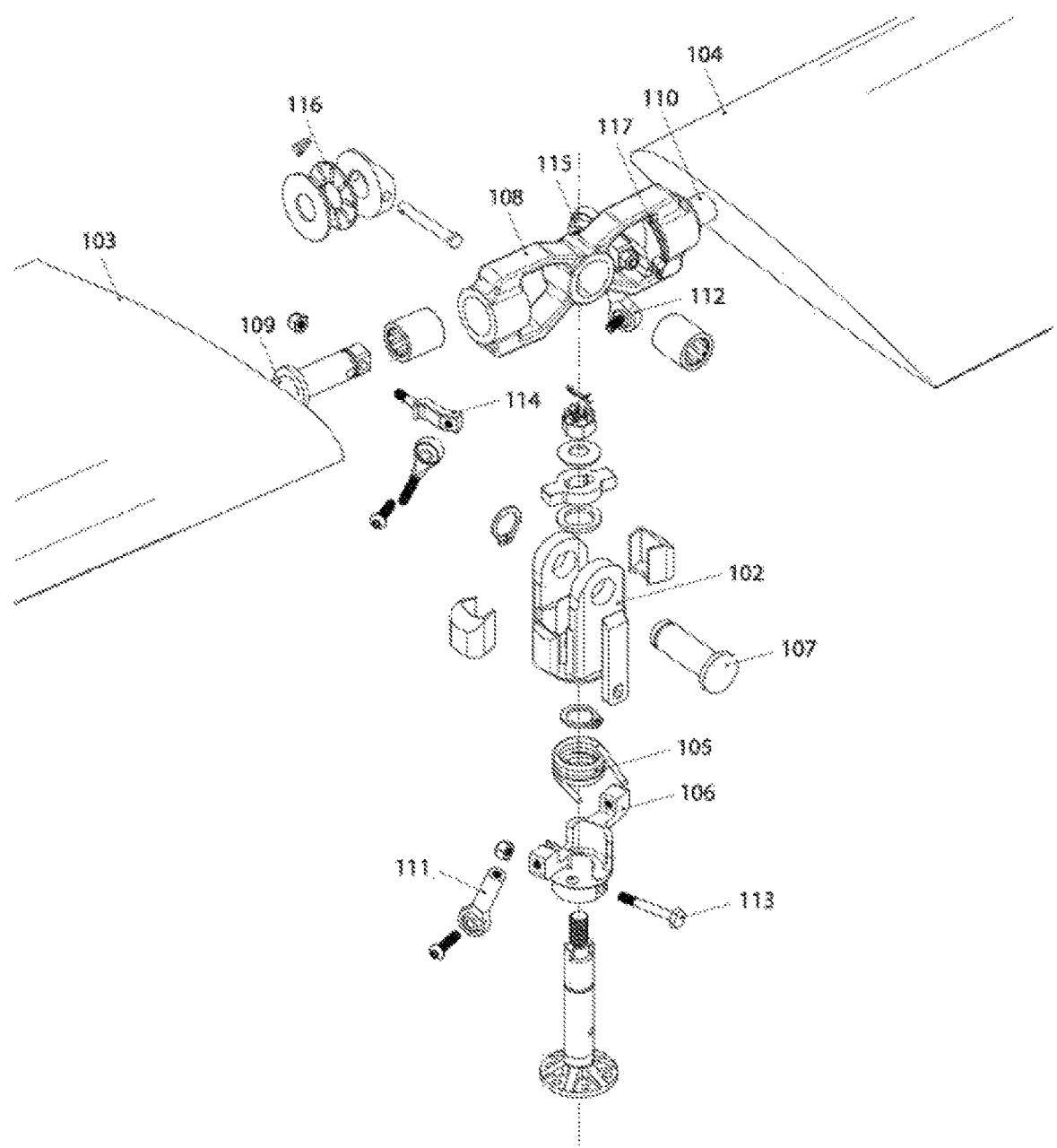
FIG. 8 is an exploded view of rotor hub 102 of FIG. 7.

FIG. 8 is an exploded view of rotor hub 102 of FIG. 7. Each rotor blade 103, 104 has a blade shaft 109, 110, inserted through bearings and guides in the teetering blade mount 108. Each shaft is retained by actuator arms 114, 115, and thrust bearings 116, 117, providing low-friction adjustment of the blade incidence angle, as the blades exert centripetal force through rotation, driven by the electric motor 100. While the drive shaft from the motor 100 is secured to the base actuator 106 with the base lock bolt 113, the rotor hub 102 can move over a limited angle with respect to the drive shaft and base actuator 106. Torsion spring 105 applies a force that rotates the rotor hub 102 into an inactive state when the electric drive motor 100 is unpowered or lightly powered. The spring 105 is designed such that when the electric drive motor 100 exerts a torque greater than some fraction of its normal operating torque, for example 50%, the motor torque overcomes the spring 105 force, and the rotor hub 102 rotates into an active position. The rotation of the base actuator 106 with respect to the rotor hub 102 causes the ball linkages 111 and 112 to push upward on the actuator arms 114, 115, which in turn rotates the blades 103, 104, increasing their angle of incidence.

Figure 9A:
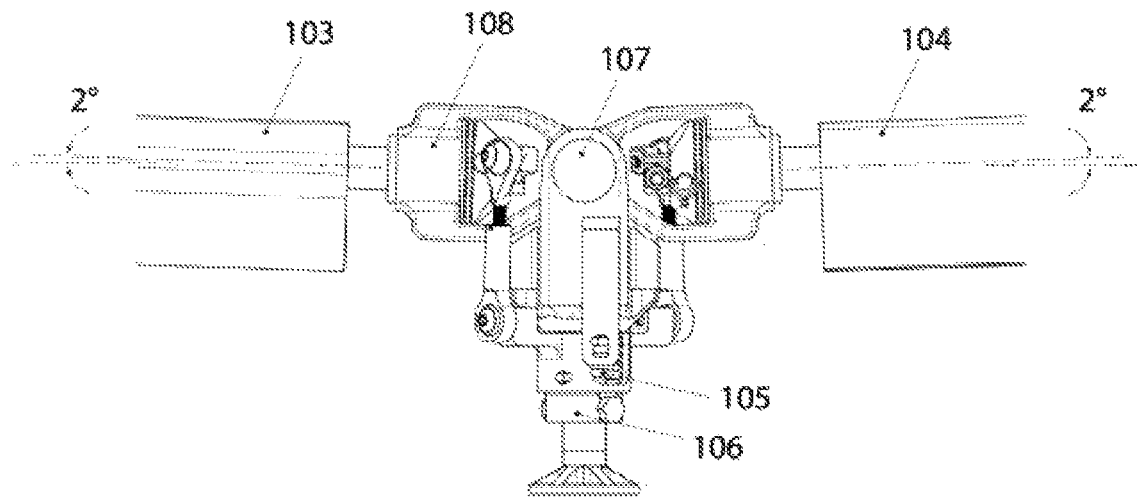
FIG. 9A is an isometric side view of rotor blades 103, 104 and rotor hub 102 of FIG. 7 showing teetering hinge 107 in a neutral state.
Figure 9B:
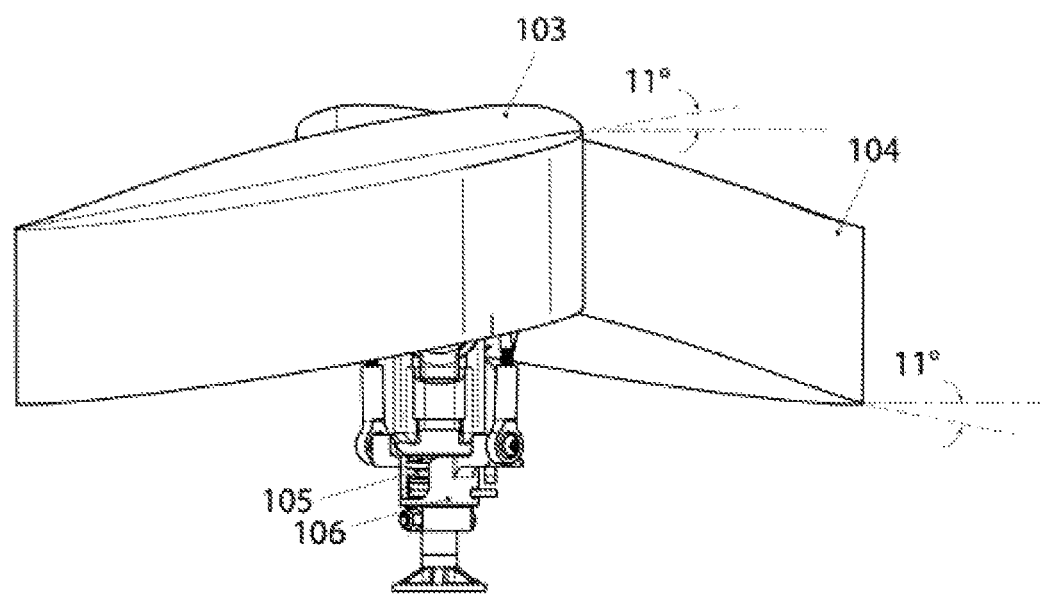
FIG. 9B is an isometric end view of rotor blades 103, 104 and rotor hub 102 of FIG. 7 showing teetering hinge 107 in a neutral state.

FIG. 9A is an isometric side view of rotor hub 102 of FIG. 7 showing teetering hinge 107 in a neutral state. FIG. 9B is an isometric end view of rotor blades 103, 104 and rotor hub 102 of FIG. 7 showing teetering hinge 107 in a neutral state.

In FIG. 9A, there is 2 degrees of pre-coning for each blade 103, 104 built into the teetering blade mount 108. Pre-coning is a common feature of many helicopter rotors, as it relieves the stress at the blade root, because the blades naturally move toward a similar coning angle under loaded flight conditions. With teetering hinge 107 being in a neutral state, both blades 103, 104 have an incidence angle of 11 degrees. Thus, when the teetering hinge 107 is in a neutral state, there is no Delta-3 adjustment to blade incidence angle.

Figure 10A:
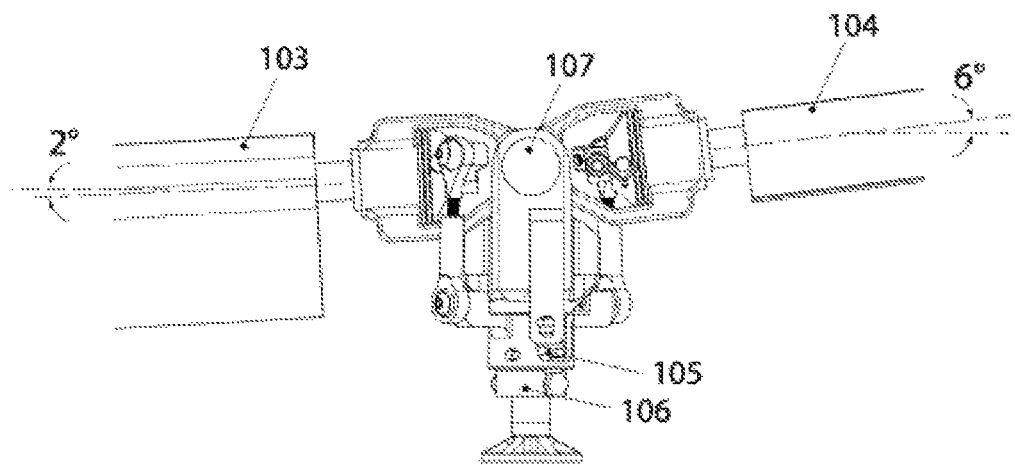
FIG. 10A is an isometric side view of rotor blades 103, 104 and rotor hub 102 of FIG. 7 showing teetering hinge 107.
Figure 10B:
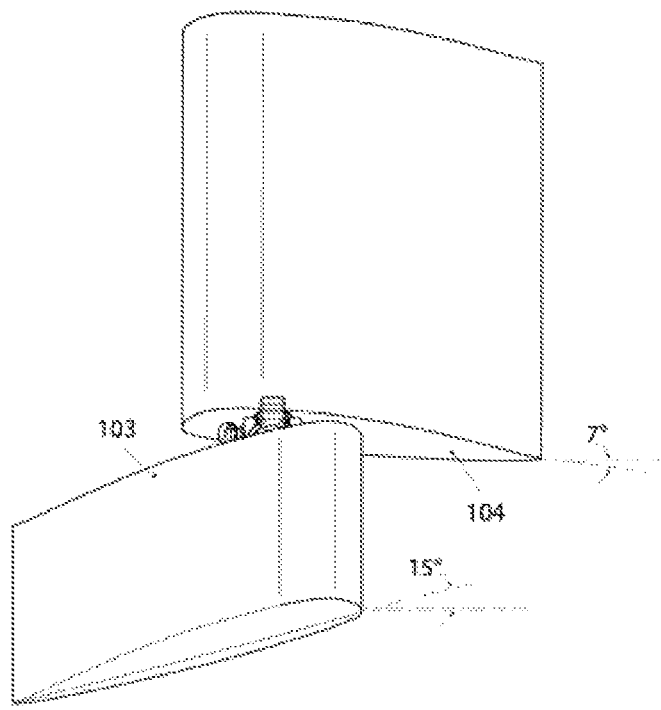
FIG. 10B is an isometric view of rotor blades 103, 104 and rotor hub 102 of FIG. 7 showing teetering hinge 107 in an active state.

FIG. 10A is an isometric side view of rotor blades 103, 104 and rotor hub 102 of FIG. 7 showing teetering hinge 107 in a flapped state. FIG. 10B is an isometric end view of rotor blades 103, 104 and rotor hub 102 of FIG. 7 showing teetering hinge 107 in a flapped state. The teetering hinge 107 shows flapping, with blade 104 raised by 6 degrees with respect to the horizon, and blade 103 drooping by 2 degrees with respect to the horizon. In this embodiment, the mechanical geometry provides a 45-degree Delta-3 coupling between the flapping and feathering axes. Such coupling results in a degree-for-degree adjustment of the blade incidence angle relative to the teetering/flapping angle. FIG. 10B is an isometric view of rotor blades 103, 104 and rotor hub 102 of FIG. 7 showing teetering hinge 107 in an active state. As can be seen in FIG. 10B, blade 103 has increased blade incidence angle to 15 degrees, from a nominal 11 degrees, while blade 104 has decreased blade incidence angle to 7 degrees, from a nominal 11 degrees.

One should note that the effect of the Delta-3 coupling upon blade incidence is additive to the effect induced by the torque-activated mechanism 105, 106. Consequently, the beneficial effects of Delta-3 coupling are realized for both powered flight, when the average blade incidence is 11 degrees, for example, as well as for autorotative flight, when the average blade incidence is 1 degree, for example. Thus, the design emulates the effect of dropping collective in a traditional helicopter, wherein the rotor includes a swashplate, and the teetering rotor hub has Delta-3 coupling.

Figure 11A:
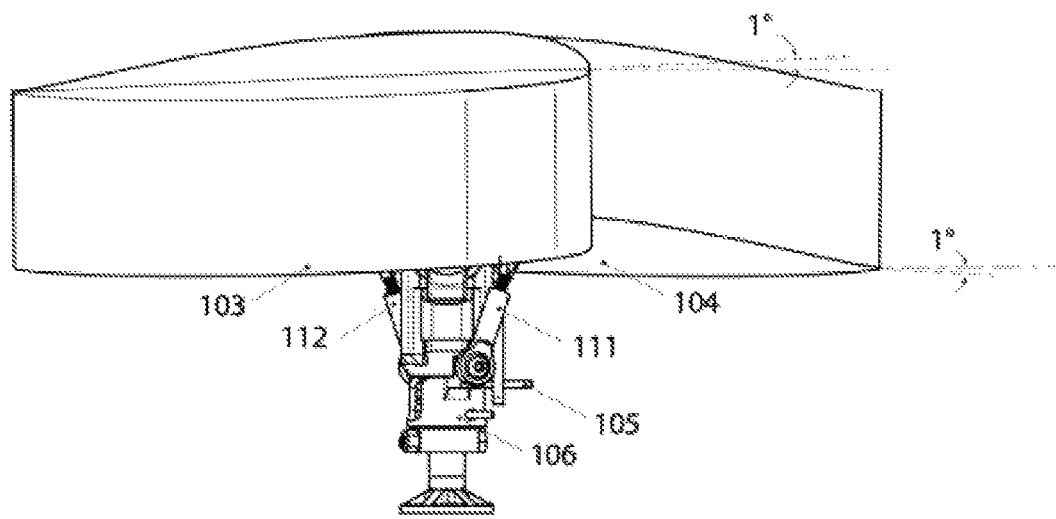
FIG. 11A is an isometric view of rotor blades 103, 104 and rotor hub 102 of FIG. 7.
Figure 11B:
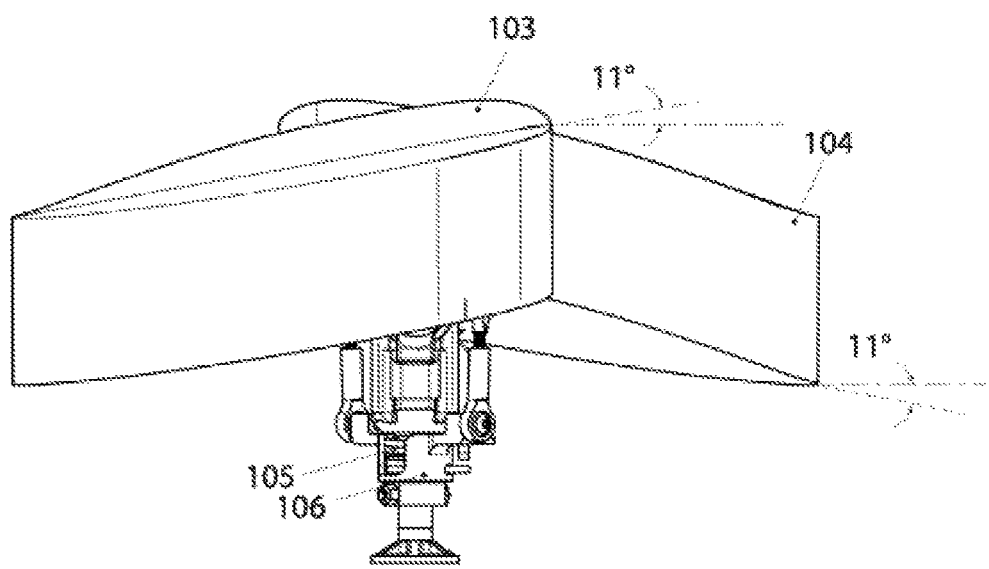
FIG. 11B is an isometric view of rotor blades 103, 104 and rotor hub 102 of FIG. 7.

FIGS. 11A and 11B are end views of the rotor blades 103, 104, to illustrate the change in incidence angle brought about through the torque-activated mechanism 105, 106. In FIG. 11A, the electric drive motor is unpowered, and thus no torque is applied to base actuator 106. Because there is no torque being applied, the spring 105 forces the rotor hub 102 into the inactive state. The rotor hub being in the inactive state causes a reduction of blade incidence angle through linkages 111, 112, and actuator arms 115, 116. In FIG. 11A, each blade has a 1 degree incidence angle, having opposing slope with respect to the direction of view. A shallow incidence angle is beneficial for autorotative flight. In FIG. 11B, the electric drive motor 100 is applying torque to overcome a threshold into the torque-activated mechanism 105, 106. The presence of torque sufficient to overcome the spring 105 moves rotor hub 102 into the active state, coupling through linkages 111, 112, and actuator arms 115, 116, increasing blade incidence. In FIG. 11B, viewing from the end of the blades 103, 104, with the blades 180 degrees apart in azimuth, there is a 11-degree active incidence angle, typical of powered rotor flight conditions.

The rotor system can be adopted for benefit in many different electric rotorcraft architectures. One exemplary application would be as a replacement for the fixed propellers and single-quadrant ESCs typically used for quadcopters. Another application of the present rotor system is for use in combination with systems that provide electrical braking. When there is no torque being applied to the rotorcraft, the rotorcraft might enter a mode of autorotative descent. In such a mode, electrical braking can recharge a dead battery and control the yaw of the vehicle among other benefits that may help one having ordinary skill in the art.

In FIG. 5, each rotor 204, 206, 208, includes a mechanism to allow adjustment of the blade pitch, the mechanism electrically controlled from a flight control computer. The safety issue inherent with such a solution is relying upon the ongoing operation of the collective control, during a period when power has been lost from the drive motor. Certainly, one can envision back-up power and control schemes to allow the collective control to operate, even when the drive motor, motor controller, or battery system have failed. However, such back-up schemes add complexity, weight, cost, and certification time, while most certainly resulting in a less reliable solution than a passive mechanism can offer. Consequently, the inclusion of the torque activated rotor system in the present application provides a benefit. More generally speaking, any multi-copter design with sufficiently low disk loading would benefit from the torque activated rotor system, as it provides a mechanical means to ensure autorotative descent in an absence of power. Moreover, embodiments which include the teetering hinge with Delta-3 coupling would have reduced mechanical stress, compared with rigid rotors that are otherwise used in multi-copters.

Another use of the torque activated mechanism, is in a rotorcraft having two contra-rotating rotors with fixed collective pitch, propelled into vertical flight with a single drive motor. Without a means to reduce the collective blade pitch, for at least one rotor, the Contra-Rotating Electric Helicopter cannot achieve or sustain autorotation. This becomes a key safety issue for larger embodiments, especially when they are crewed.

Figure 12A:
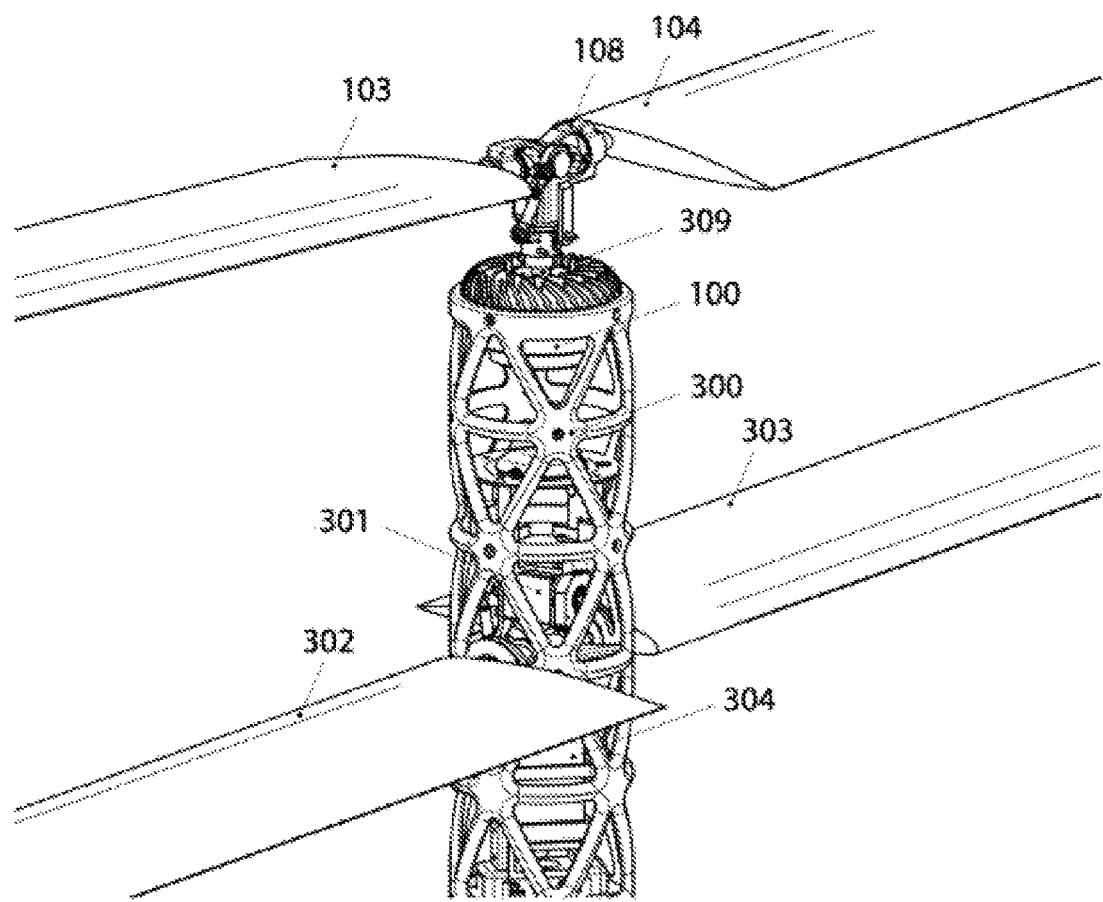
FIG. 12A is an isometric view of a rotor system integrated with Contra-Rotating Electric Helicopter in accordance with one embodiment of the invention.
Figure 12B:
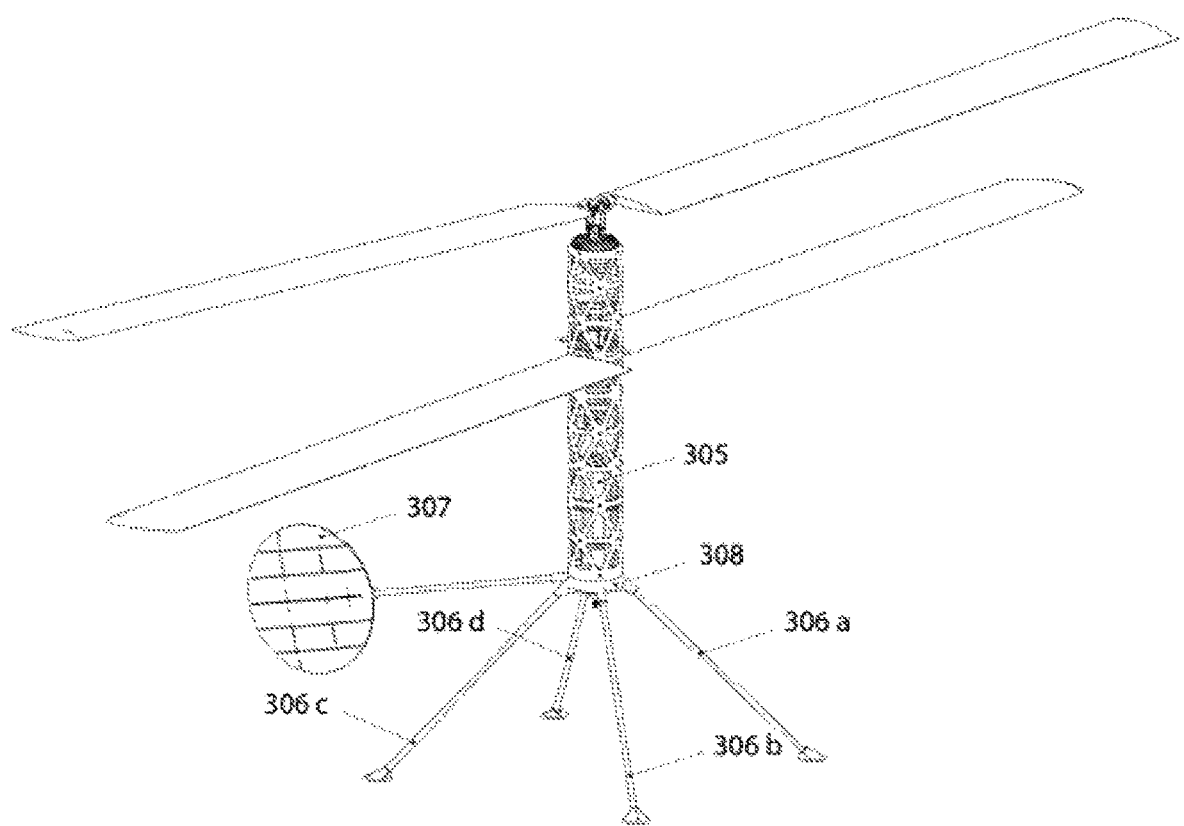
FIG. 12B is a zoomed out view of the rotor system of FIG. 12A.

FIGS. 12A and 12B illustrate an embodiment of a Contra-Rotating Electric Helicopter including a torque activated pitch adjustment mechanism The rotor system in FIGS. 12A and 12B has been employed for the upper rotor coupled to the output shaft 309 of the electric drive motor 100. The isogrid truss cylinder 300, containing the flight controller 304, battery system 305, drive motor 100, cyclic mechanism 301 and lower rotor with blades 302, 303, is driven into a clockwise rotation by the counter-torque resulting from the gear-reduced electric drive motor 100 turning the upper rotor, with teetering blade mount 108, and rotor blades 103, 104, in a counter-clockwise direction. The battery system 305 includes both the battery management system 122 and battery modules 121. In this embodiment, the battery management system 122 also includes super capacitors, with a purpose of providing short-term power during an emergency loss of power from the battery modules 121.

In one embodiment, the Contra-Rotating Electric Helicopter of FIGS. 12A and 12B has two contra-rotating sections, without the necessity for a stationary frame of reference, such as a typical fuselage. To allow the helicopter to take off and land from locations not having infrastructure specifically designed for the Contra-Rotating Electric Helicopter the lower portion of the helicopter has been included. FIG. 12B illustrates the embodiment to include a swivel base 308, with landing legs 306a, 306b, 306c, 308d, and a tail 307. The swivel base 308 can turn freely from the isogrid truss cylinder 300, and various components mounted within 300, which are normally spinning in a clockwise direction during flight. The tail 307 remains aligned with the airflow during forward flight, similar to the tail of a weathervane. Thus, the swivel base 308, to which the tail 307 is coupled, becomes aligned with the airflow, as do the landing legs 306a, 306b, 306c, and 306d. Regardless of whether the helicopter is undergoing powered flight or autorotative descent, the landing legs remain in a non-rotating frame of reference, enabled by forward airspeed, easing the process of both take-off and landing the Contra-Rotating Electric Helicopter.

Upon a sudden loss of power, for example from a battery module 121 failure, the incidence angle for the upper rotor blades 103, 104 becomes reduced to 1 degree, due to the torque activated mechanism, supporting an immediate transition to autorotative descent. The ESC 119 for the electric drive motor 100 is integral to the motor housing in this embodiment. Acting as a speed governor for the upper rotor with blades 103, 104, during autorotative descent, the braking function of the ESC 119 recovers a portion of the rotor energy and transfers it to the battery management system 122 and the super capacitors contained within it. As the Contra-Rotating Electric Helicopter approaches the ground, power recovery is initiated by the flight computer 120, using the stored energy from the super capacitors within the battery management system 122, allowing the aircraft to execute a flare procedure and controlled touchdown, either autonomously, or under pilot control.

Figure 13:
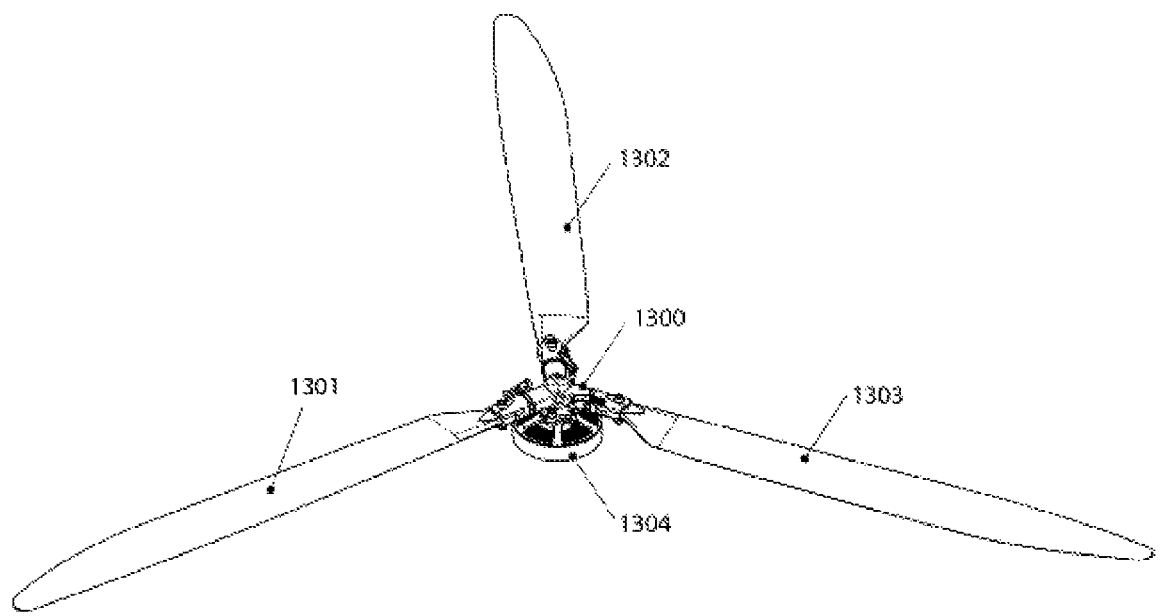
FIG. 13 is an isometric view of a three-bladed rotor system for a UAV in accordance with an embodiment of the invention.

The torque activated pitch adjustment mechanism can be applied to Uncrewed Aerial Vehicles (UAVs), such as multi-copters generically described as drones. Incorporating the torque activated pitch adjustment mechanism in UAV designs enables autorotation as a safety feature to protect life and property on the ground. An exemplary torque activated pitch adjustment mechanism designed for UAV applications is shown in FIG. 13. Three blades are included in the exemplary design, though other embodiments include any number of blades. The rotor assembly 1300 will be described in more detail in the paragraphs to follow. The rotor is driven by a BLDC motor 1304. This exemplary motor has a KV170 speed rating, 14 pole pairs, and a mass of 130 g. Each of the three rotor blades 1301, 1302 and 1303 are designed with the OA209 airfoil, having a length of 360 mm and an average chord width of 36 mm. The blade design utilizes an optimized planform and twist to maximize the rotor merit factor in forward flight. This rotor system embodiment operates in a counter-clockwise direction. Another embodiment of the rotor system is designed to operate in a clockwise direction. Each of the rotor blades 1301, 1302 and 1303 are attached to the rotor assembly 1300 using a single nut and bolt, which allows movement of the blades in the lead/lag axis to relieve mechanical stress during flight. There is no provision for flapping relief in this embodiment, which is typical of low-mass UAVs. Articulation of the blades in the feathering axis is the made possible by the mechanism within assembly 1300.

Figure 14:
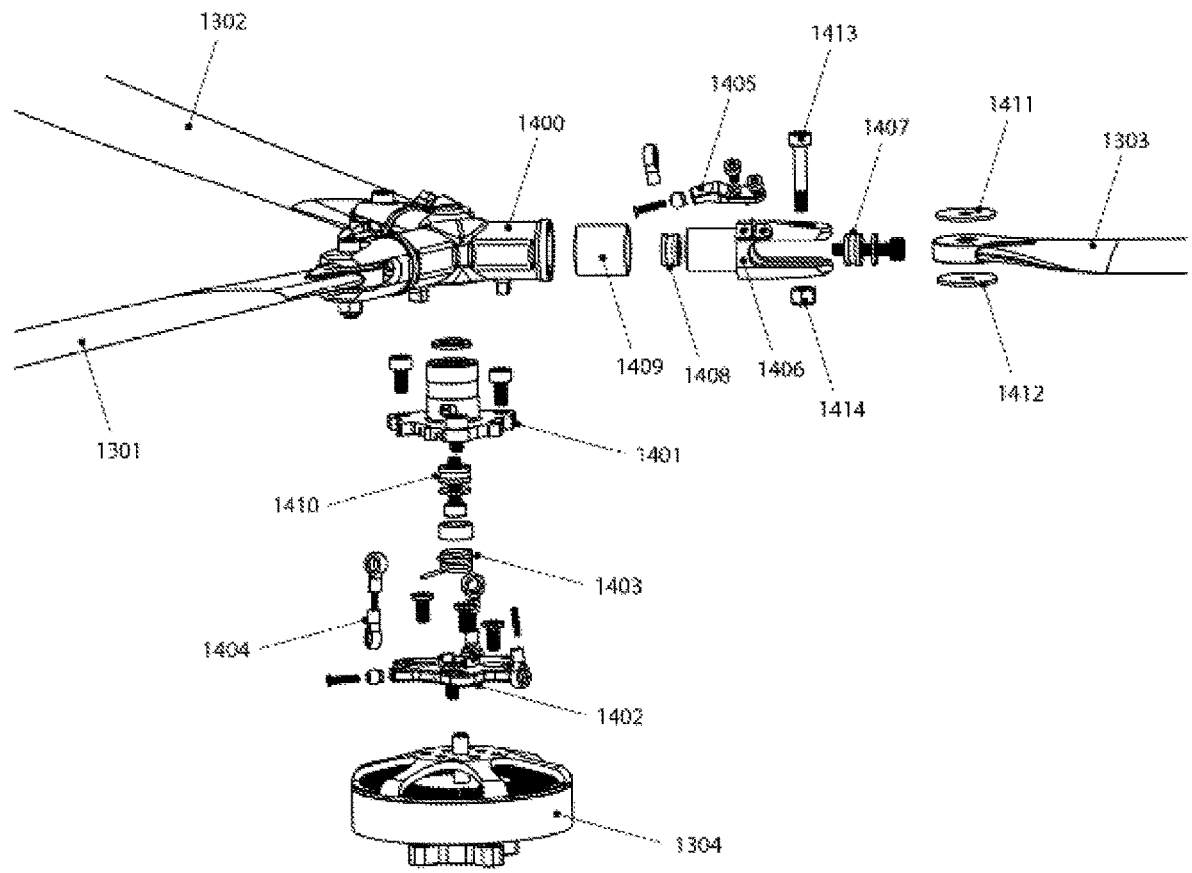
FIG. 14 is an exploded view of the three-bladed rotor system of FIG. 13.

FIG. 14 illustrates an exploded view of the rotor assembly 1300, the brushless DC motor 1304, and the rotor blades 1301, 1302, and 1303. The rotor hub 1400 has blade sub-assembles rotably mounted to it, while the rotor hub 1400 is rotably mounted to the hub mount 1401 and articulation plate 1402. The articulation plate 1402 is mounted to the top of the BLDC motor 1304 using screws. The hub mount 1401 and articulation plate 1402 are then affixed to one another with screws. The rotor hub 1400, including rotor blades 1301, 1302 and 1303, are coupled to the hub mount 1401 and articulation plate 1402 through the torsion spring 1403. The torsion spring 1403 is a coil fabricated from spring steel, including tails that project from the top and bottom in lateral directions. The lateral directions of the tails have an angle relative to each other. The lower tail is held tightly between hub mount 1401 and articulation plate 1402, while the upper tail is held by the rotor hub 1400.

When the BLDC motor 1304 applies torque through 1402 and 1401, the entire assembly from 1304 and above begins to spin in a counter-clockwise direction about the Z-axis. In addition, spring 1403 becomes compressed, in a rotational direction, as a function of the applied motor torque, causing the angle between the lateral directions of the tails to decrease. The compression of spring 1403 therefore allows the articulation plate 1402 to adjust its angular orientation about the central axis of rotation relative to the rotor hub 1400, which lags due to the transient rotor inertia and subsequent aerodynamic forces on rotor blades 1301, 1302 and 1303. Ball linkage 1404 is one of three that couple the articulation plate 1402 with the three pitch horns, such as pitch horn 1405. Limited movement of the articulation plate 1402 about the Z-axis causes limited movement of each rotor blade 1301, 1302 and 1303 about its feathering axis, through ball linkage 1404. For example, as 1402 advances relative to 1400, pitch horn 1405, attached to blade stem 1406, pulls downward, causing the incidence of blade 1303 to increase.

In the embodiment of FIG. 14, the angular articulation of 1400 with respect to hub mount 1401 is limited, as with the articulation of each blade stem with respect to 1400, and thus several bearings are included to reduce friction forces and mechanical wear. Bearing 1410, for example, provides a low-friction interface between 1400 and 1401. Similarly, blade stem 1406 is mounted to the rotor hub 1400 through a pair of bearings 1407 and 1408. A brass sleeve 1409 prevents abrasion between the blade stem 1406 and the rotor hub 1400. Because each rotor blade can lead and lag during flight, the mounting of rotor blade 1303, for example, includes the shoulder bolt 1413, lock nut 1414, as well as washer bearings 1411 and 1412, fabricated from PTFE.

In the rotor system illustrated in FIG. 14, mechanical hard stops limit the rotation of 1401 and 1402 with respect 1400. However, unlike the prior embodiment, wherein the change in blade incidence from the autorotative state to the powered state occurs over a narrow range of drive motor torque, this embodiment enables variable blade incidence over a broad range of drive motor torque. In this embodiment, the incidence of all three rotor blades 1301, 1302 and 1303 are held at 0.0 degrees when BLDC motor 1304 applies zero torque, and blade incidence cannot go beyond 0.0 degrees when motor 1304 applies negative torque through electrical braking. When BLDC motor 1304 applies positive torque, spring 1403 gradually compresses, allowing an increase in blade incidence proportionate with the required flight torque. In this embodiment, 0.67 Nm of torque causes the maximum rotation of 1401 and 1402 with respect to 1400, which results in a maximum blade incidence of 13.0 degrees. If the motor torque exceeds 0.67 Nm, the blade incidence is limited by the mechanical hard stop to 13.0 degrees. Between the two extremes, for example, the hovering flight torque of BLDC motor 1304 is 0.47 Nm, resulting in a blade incidence of 9.1 degrees. In other various embodiments, the torque spring 1403 compresses as various functions of motor torque applied to the spring. A near step-like function can be used to flip to a low angle of attach under a complete loss of power and a high angle of attack when power is being used to torque the rotor. In other embodiments, the function of torque is linear, parabolic, or any other function desired by one having skill in the art to control collective pitch as a function of the torque applied by the motor.

As described above, motor 1304 applies torque through spring 1403, causing counter-clockwise rotation of the rotor hub 1400 and the coupled rotor blades. When the motor torque changes, and the aerodynamic and friction forces do not provide a balancing torque, acceleration or deceleration of rotor speed occurs, until a new equilibrium rotor speed is reached. In equilibrium, the torque from motor 1304 is balanced with the sum of the aerodynamic drags of blades 1301, 1302 and 1303 moving about the Z-axis, and the sum of the blade pitching moments translated through the ball linkages to articulation plate 1402. The rotor system embodiment depicted in FIG. 14 uses mechanical leverage to couple the torque from 1402 into the feathering axes of the rotor blades. 20 degrees of twisting displacement of 1402 relative to 1400 results in a 10 degree increase in blade incidence. With three rotor blades and said leverage, approximately 1.5× the pitching moment of a single rotor blade is combined with the aerodynamic drag moments. The pitching moment of each blade depends upon the angle of attack, which is a function of both blade incidence and the induced velocity through the rotor. In general, airfoils designed for rotorcraft, such as OA209 in this embodiment, have low pitching moments. Consequently, the dominant torque balancing with the motor torque occurs through the aerodynamic drag of the blades spinning about the Z-axis.

Figure 15:
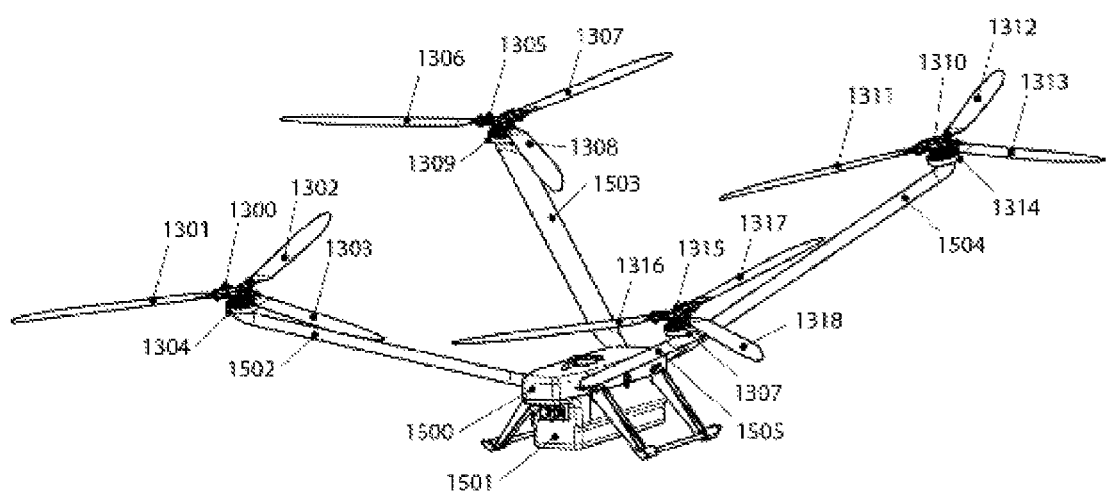
FIG. 15 is an isometric view of UAV quad-copter in accordance with one embodiment of the invention.

FIG. 15 illustrates a UAV quad-copter with a total mass of 5.5 kg. Each of the rotor systems are of the type illustrated in FIG. 13 and FIG. 14. Rotor assemblies 1300 and 1310 are of the variety described in the preceding paragraphs, turning in a counter-clockwise direction. Rotor assemblies 1305 and 1315 are designed to turn in a clockwise direction. Rotor assembly 1300 includes rotor blades 1301, 1302 and 1303, with drive power provided by BLDC motor 1304. Rotor assembly 1305 includes rotor blades 1306, 1307 and 1308, with drive power provided by BLDC motor 1309. Rotor assembly 1310 includes rotor blades 1311, 1312 and 1313, with drive power provided by BLDC motor 1314. Rotor assembly 1315 includes rotor blades 1316, 1317 and 1318, with drive power provided by BLDC motor 1319. The electronic speed controls (ESCs) for each motor 1304, 1309, 1314 and 1319 are mounted within the fuselage 1500. The ESCs can operate in a powered mode or in a braking/regeneration mode. Throttle commands from the flight controller, typically in the form of pulse-width or pulse-position modulation, indicate the degree of throttle or braking to be applied. Three-wire connections for each motor run through the corresponding airfoil struts 1502, 1503, 1504 and 1505. As was described in U.S. Pat. No. 11,597,505, "Rotorcraft Optimized for Forward Flight," the airfoil struts are mounted with an incidence angle to provide augmented lift when at the cruising speed. The airfoil shape is NACA0024, with a thickness of 24% relative to the chord width. To avoid stall conditions, the angle of attack for the airfoil struts is 5 degrees when the fuselage is in level flight. As the UAV depicted in FIG. 15 is designed for long range and endurance, the battery module 1501 represents 52% of the total UAV weight.

A key issue in efforts to scale a quad-copter drone to become a crewed eVTOL, or even to reduce the disk loading of a drone below industry practices, is dealing with rotor inertia. Computing swept rotor area, while maintaining constant disk loading, requires the blade length to scale with the square-root of the aircraft weight, since area equals $\pi$ times radius squared. However, the mass of a rotor blade, presuming constant material density, grows with the cube of the blade length. This means the rotor blade mass grows with the aircraft mass raised to the (3/2)-power. Consequently, the rotor blades become an increasing percentage of the overall aircraft weight, and the response of the rotor systems to changes in motor power becomes muted by the increasing angular momentum. We define a time parameter t to provide an intuitive understanding for the control system challenge:

$$\tau = \frac{E_r}{P_r}$$

$E_r$ is the rotational kinetic energy within the rotor system, and $P_r$ is power necessary to sustain the rotor speed for a given flight condition, such as hovering.

Presuming rotor blades of constant chord width, it can be shown that:

$$E_r = \frac{1}{6} n_b m_b (\Omega R)^2$$

Where $n_b$ is the number of rotor blades for the rotor, $m_b$ is the mass of a single blade, R is the rotor diameter, and $\Omega$ is the angular velocity of the rotor, in radians per second.

During hovering flight, $P_r$ is computed as follows:

$$P_r = \frac{T^{3/2}}{M\sqrt{2\rho A}}$$

Where T is the thrust of the rotor, M is the merit factor of the rotor, $\rho$ is the density of air, and A is the swept area of the rotor, or $\pi R^2$.

Because the ratio of the rotational kinetic energy to the rotor power has the units of Joules in the numerator, and Joules per second in the denominator, $\tau$ has the units of seconds. In essence, $\tau$ represents the amount of stored energy that would sustain the rotorcraft in flight, in the absence of additional power. This is a rough idea however, because the rotor speed would decay exponentially in the absence of shaft power. From another perspective, $\tau$ also represents the time it takes the rotorcraft to respond to changes in shaft power applied to a rotor having fixed pitch propellers or rotor blades.

A commercially successful quad-copter drone is the DJI Mavic 3. Based upon available data for this drone model, we compute a value of $\tau$=314 mS. With a response time of a fraction of a second, one can intuitively reason that the DJI Mavic 3 will be highly responsive to RPM control. Moreover, DJI is known to employ electrical braking in their ESC designs and control methods, which allows the rotational energy to be depleted faster than nature would otherwise provide, thus improving the drone responsiveness. At the other extreme, we consider the Bell 407 helicopter, a 7-passenger turbine-powered helicopter having four rotor blades. Based upon available data, we compute a value of $\tau$=12.7S. Such a large time constant allows the human pilot two or three seconds to identify an engine-out condition and drop collective before the rotor speed has irrecoverably decayed. On the other hand, one can clearly see that RPM control of a 7-passenger helicopter is a physical impossibility.

Crewed helicopter designers have understood that RPM control was not feasible since the earliest research efforts. In fact, one of the first quad-copters, designed by Etienne Oehmichen in 1923, utilized wing warping to adjust blade incidence, while leaving the motor speed constant. Today, all commercial helicopters maintain constant motor RPM, while adjusting collective blade incidence to modulate the aircraft thrust. When collective incidence is increased, the motor must respond with increased torque, else rotor speed decays.

Certain embodiments of the rotor system achieve an improvement in the responsiveness of rotor thrust, by adapting the blade incidence as a function of the applied electric drive motor torque. In essence, the mechanism within the rotor head provides collective control without the usual mechanisms required. For a typical electrically-powered rotorcraft, adding collective control to a rotor typically involves a separate servo actuator, a driving circuit for the servo actuator, and a rotor pitch control assembly. Beyond the cost associated with the electrical and mechanical components, the compounded risk of failure is much greater than for a purely mechanical solution.

The linear response of blade incidence relative to motor torque has been described for the embodiment of FIG. 14. Because blade incidence results in a roughly linear response of lift coefficient, we can expect a roughly linear response of blade lift coefficient relative to motor torque. Rotor thrust is computed with the following:

$$T = c_t \pi R^2 \rho (\Omega R)^2$$

Where $c_t$ is rotor system coefficient of thrust. A common approximation of $c_t$ is:

$$c_t = \frac{\sigma}{6}\overline{C}_l$$

Where $\sigma$ is the rotor solidity and $\overline{C}_l$ is the average coefficient of lift for the rotor blade. Thus, we can conclude that a linear response of blade incidence relative to drive motor torque causes a transient linear response of thrust.

However, we must observe that the rotor torque is computed with the following:

$$Q = c_q \pi R^2 \rho (\Omega R)^2 R$$

Where $c_q$ is the rotor system coefficient of torque. Thus, a linear increase in torque, under a condition of constant rotor speed, results in a linear increase in the coefficient of torque. Next, we consider the relationship between $c_q$ and $c_t$ for a rotor composed of ideally-twisted rotor blades of constant chord:

$$c_q = \frac{c_t^{3/2}}{\sqrt{2}} + \frac{\sigma\delta}{8}$$

Where $\delta$ is the average profile-drag coefficient. The second term in the equation for $c_q$ represents the contribution of rotor drag when the rotor provides no thrust, for example when the collective blade pitch is near 0 degrees. Ignoring this contribution to the torque coefficient, we observe that $c_q$ scales with $c_t^{3/2}$. We can thus conclude that $c_t$ scales with $c_q^{2/3}$. Hence, for the embodiment of the rotor represented in FIG. 14, the transient rotor thrust will increase in proportion to the motor torque, though the steady-state rotor speed must then slow to satisfy the relationship between the coefficient of thrust and the coefficient of torque. This is less than ideal from a control system perspective, because the thrust does not follow a monotonic time progression.

Alternatively, consider a non-linear spring with a response that scales blade incidence in proportion to the motor torque raised to the (2/3)-power. Now, the resulting c t scales in proportion to $c_q^{2/3}$, which implies a constant rotor speed over variation in motor torque. More generally describing the physics, an exponent greater than 2/3 for the spring response results in a reversal of thrust change following the transient response (underdamped response), while an exponent lesser than 2/3 results in a monotonic change in thrust following the transient response (overdamped). Because the goal of the design is to maximize the short-time control authority, many embodiments adopt the largest exponent that would not cause a subsequent reversal in thrust (critically damped), which is adapting collective blade incidence in proportion to the motor torque raised to the (2/3)-power. Certainly, many other embodiments with non-linear spring responses are feasible, including those accounting for the zero-thrust drag contribution, those with adjustment mechanisms to be useful for various aircraft, and those with dynamic adjustment of the spring characteristics during flight.

Figure 16:
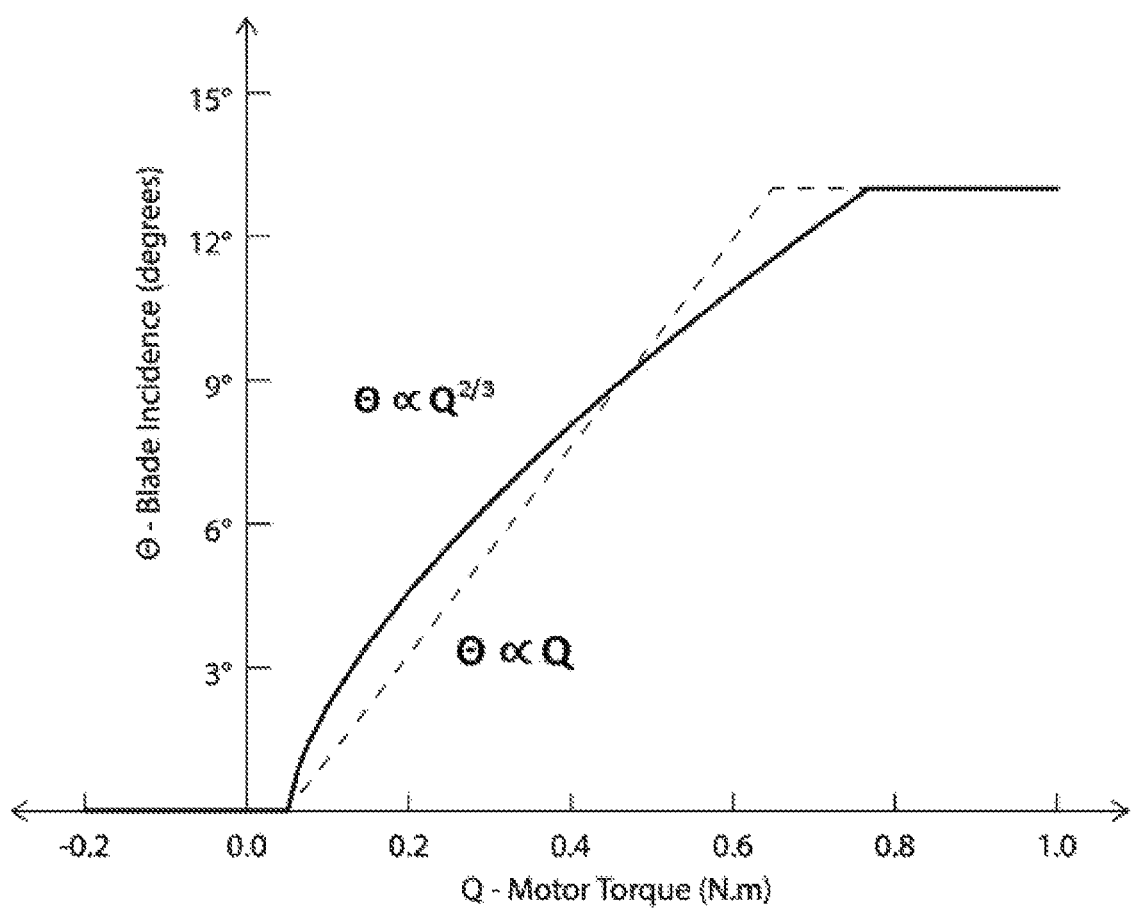
FIG. 16 is a graphical comparison of linear and non-linear spring mechanisms responding to drive motor torque.

FIG. 16 illustrates a comparison of the linear and non-linear spring responses. In both instances, the rotor mechanism is held at the 0.0-degree blade incidence hard stop for autorotation purposes, offset with 0.05 Nm of spring-induced torque. Once this spring torque is overcome with motor torque, the linear spring progresses through blade incidence until the 13.0-degree hard stop is reached with 0.648 Nm of motor torque. The embodiment with the non-linear spring progresses from 0.0-blade incidence to the 13.0-degree hard stop with 0.767 Nm of motor torque. Between the two extremes, both the linear and non-linear embodiments are designed to reach the nominal hovering blade incidence of 9.1 degrees with 0.470 Nm of motor torque.

Non-linear springs have been studied for many applications. Embodiments of the rotor system employing non-linear springs include those using rubber elastomers, wherein the tension or compression occurs over a large enough range to elicit a non-linear response. Other embodiments use flexures fabricated from metal or plastic, such as pin flexures, blade flexures and notch flexures.

In FIG. 6, electric motor 100 is powered from motor controller 119. As previously mentioned, motor controller 119 would normally be described as an "electronic speed control" (ESC). For electrically powered rotorcraft utilizing RPM control of the electric motors, the ESC descriptive naming is appropriate. Rotorcraft employing bi-modal embodiments of the rotor system would be controlled by ESCs. However, rotorcraft employing the rotor system embodiments wherein blade incidence varies through the range of operating motor torque values, particularly with designs explicitly targeting constant rotor RPM, a form of motor controller is required. In the position of motor controller 119, said motor controller would be described as an "electronic torque control" (ETC). In certain embodiments of the ETC, a range of input values from the flight controller 120 command the ETC to operate in a braking state, whereby the input values signify the negative (braking) torque to be applied from the motor to the rotor. Over another range of input values from the flight controller 120, the ETC operates in a powered state, whereby the input values signify the positive (driving) torque. Such embodiments of the ETC support both the autorotative functionality of the rotor, wherein the blade incidence is shallow, as well as the powered variable blade incidence functionality of the rotor.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A rotor system for an electrically-powered rotorcraft comprising:
    a rotor hub coupled to an electric drive motor and a set of at least two rotor blades, the rotor blades being configured to provide lift to the rotorcraft and having a collective angle of incidence; and
    a torque-activated mechanism within the rotor hub, coupled to the set of rotor blades, configured to adjust the collective angle of incidence as a function of torque applied to the rotor hub from the drive motor and mechanically bias the collective angle of incidence to a minimum angle under a circumstance in which torque from the drive motor falls below a threshold.

2. A rotor system according to claim 1, further comprising a drive motor controller, coupled to the electric drive motor, configured to cause electrical braking of the drive motor, under the circumstance, to regulate rotor angular velocity.

3. A rotor system according to claim 2, wherein the torque-activated mechanism includes a spring configured to allow the collective angle of incidence of the set of rotor blades to vary with the function of torque applied to the rotor hub.

4. A rotor system according to claim 2, wherein the drive motor controller is configured so that the electrical braking causes recovery of energy from the drive motor.

5. A rotor system according to claim 4, further comprising a set of super capacitors associated with the drive motor controller, the set of super capacitors configured to store the energy recovered by the electrical braking.

6. A rotor system according to claim 2, wherein the rotor system is configured for a quadcopter.

7. A rotor system according to claim 2, wherein the rotor system is configured for a contra-rotating electric helicopter having a pair of rotors.

8. A rotor system according to claim 2, wherein the rotor system is configured for a multi-copter having more than four lift rotors.

9. A rotor system according to claim 2, wherein the torque activated mechanism is configured to adjust the collective angle of incidence as a non-linear function of torque applied to the rotor hub.

10. A rotor system for an electrically-powered rotorcraft comprising:
   a rotor hub coupled to an electric drive motor and a set of at least two rotor blades, the rotor blades being configured to provide lift to the rotorcraft and having a collective angle of incidence; and
   a torque activated mechanism within the rotor hub, coupled to the set of rotor blades, configured to mechanically bias the collective angle of incidence to a minimum angle under a circumstance in which torque applied to the rotor hub from the drive motor falls below a threshold.

11. A rotor system according to claim 10, wherein the torque-activated mechanism includes a spring, and a minimum collective angle of incidence is less than 2 degrees and, in an event wherein the torque applied to the rotor hub from the drive motor exceeds a threshold, the collective angle of incidence is configured to be between 9 to 15 degrees.

12. A rotor system according to claim 10, wherein the torque-activated mechanism includes a spring configured to allow the collective angle of incidence of the set of rotor blades to vary as a function of the torque applied to the rotor hub from the drive motor.

13. A rotor system according to claim 10, further comprising a gear-reduction mechanism, coupled between the electric drive motor and the rotor hub.

14. A rotor system according to claim 10, further comprising a Delta-3 coupling of the motion of a blade flapping axis with an axis of blade incidence.

15. A rotor system according to claim 10, wherein the rotor system is configured for a quadcopter.

16. A rotor system according to claim 10, wherein the rotor system is configured for a contra-rotating electric helicopter having a pair of rotors.

17. A rotor system according to claim 10, wherein the rotor system is configured for a multi-copter having more than four lift rotors.

18. A rotor system according to claim 10, wherein the rotor system is configured for a tilt-rotor having a plurality of propulsive articulable rotors.

19. A rotor system according to claim 10, wherein the torque activated mechanism is configured to adjust the collective angle of incidence as a non-linear function of torque applied to the rotor hub.

20. A torque activated system for biasing a collective pitch of a set of rotor blades, comprising:
   a rotor hub having a central axis of rotation and coupled to the set of rotor blades;
   an electric drive motor coupled to the rotor hub and configured to provide a torque to the rotor hub to cause rotation of the set of rotor blades;
   a set of pitch adjustment mechanisms configured to adjust the collective pitch of the set of rotor blades;
   an articulation plate (i) rotatably mounted on the central axis and coupled to the set of pitch adjustment mechanisms and (ii) configured so that rotation of the articulation plate about the central axis causes adjustment of the collective pitch of the set of rotor blades; and
   a torsion spring, disposed on the central axis between the rotor hub and the electric drive motor, which couples the motor output to the rotor hub, the torsion spring configured to be compressed as a function of the torque, wherein compression of the torque spring causes the articulation plate to adjust its angular orientation about the central axis of rotation, and thus to move the set of pitch adjustment mechanisms so as to adjust the collective pitch of the set of rotor blades in a manner responsive to the torque.

* * * * *